US012619229B2

(12) United States Patent
Sudhakaran et al.

(10) Patent No.: US 12,619,229 B2
(45) Date of Patent: May 5, 2026

(54) NETWORK AWARE AND PREDICTIVE MOTION PLANNING IN MOBILE MULTI-ROBOTICS SYSTEMS

(71) Applicant: Intel Corporation, Santa Clara, CA (US)

(72) Inventors: Susruth Sudhakaran, Beaverton, OR (US); Gagan Acharya, Riverside, CA (US); Amit Baxi, Thane (IN); Dave Cavalcanti, Portland, OR (US); Mark Eisen, Beaverton, OR (US); Ramya M, Erode (IN); Javier Perez-Ramirez, North Plains, OR (US); Shagaya Mageshkumar Vincent, Navi Mumbai Mh (IN)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 17/210,886

(22) Filed: Mar. 24, 2021

(65) Prior Publication Data

US 2021/0302956 A1      Sep. 30, 2021

(51) Int. Cl.
| | |
|---|---|
| *G05D 1/00* | (2024.01) |
| *H04B 17/309* | (2015.01) |
| *H04B 17/391* | (2015.01) |

(52) U.S. Cl.
CPC ......... *G05D 1/0027* (2013.01); *G05D 1/0214* (2013.01); *G05D 1/0287* (2013.01); *H04B 17/309* (2015.01); *H04B 17/391* (2015.01)

(58) Field of Classification Search
CPC .. G05D 1/0027; G05D 1/0214; G05D 1/0287; H04B 17/309; H04B 17/391;
(Continued)

(56) References Cited

U.S. PATENT DOCUMENTS

| | | | |
|---|---|---|---|
| 2004/0064351 A1* | 4/2004 | Mikurak | G06Q 30/0269 705/22 |
| 2005/0028115 A1* | 2/2005 | Whitefield | G01R 31/31935 716/106 |

(Continued)

FOREIGN PATENT DOCUMENTS

| | | | | |
|---|---|---|---|---|
| EP | 3751874 A1 | 12/2020 | | |
| JP | 2019505900 | * 4/2004 | ......... | G06Q 30/0269 |

(Continued)

OTHER PUBLICATIONS

JP-2019505900-A Patentscope translation (Year: 2019).*

(Continued)

*Primary Examiner* — Joan T Goodbody
(74) *Attorney, Agent, or Firm* — Banner & Witcoff, Ltd.

(57) ABSTRACT

Techniques are disclosed to facilitate multi-agent path planning and to enable navigation for robotics systems to be more resilient to wireless network related issues. The discussed techniques include enhancing path-planning algorithms to consider wireless Quality of Service (QoS) metrics for the identification of planned multi-agent paths. Moreover, the techniques include the compensation of communication and computational latencies to enable offloading of time-sensitive navigation workloads to network infrastructure components.

23 Claims, 7 Drawing Sheets

(58) Field of Classification Search
CPC .......................... G01C 21/206; G01C 21/383; G01C 21/3848; H04L 43/091
See application file for complete search history.

(56) References Cited

U.S. PATENT DOCUMENTS

| | | | |
|---|---|---|---|
| 2015/0197010 A1 | 7/2015 | Ruuspakka et al. | |
| 2019/0043251 A1 | 2/2019 | Winkle et al. | |
| 2019/0140933 A1* | 5/2019 | Guim Bernat | H04L 41/5006 |
| 2019/0155291 A1* | 5/2019 | Heit | G05D 1/0221 |
| 2019/0319868 A1* | 10/2019 | Svennebring | H04W 24/08 |
| 2022/0116814 A1* | 4/2022 | Di Girolamo | H04L 41/5032 |

FOREIGN PATENT DOCUMENTS

| | | |
|---|---|---|
| WO | 2018149901 A1 | 8/2018 |
| WO | 2019043446 A1 | 3/2019 |

OTHER PUBLICATIONS

V. R. Verma, D. P. Sharma and C. S. Lamba, "QOS Improvement in MANET Routing by Route Optimization through Convergence of Mobile Agent," 2018 5th IEEE Uttar Pradesh Section International Conference on Electrical, Electronics and Computer Engineering (UPCON), Gorakhpur, India, 2018, pp. 1-6, (Year: 2018).*
G. Vitello, A. Alongi, V. Conti and S. Vitabile, "A Bio-Inspired Cognitive Agent for Autonomous Urban Vehicles Routing Optimi-zation," in IEEE Transactions on Cognitive and Developmental Systems, vol. 9, No. 1, pp. 5-15, Mar. 2017, (Year: 2017).*
P. Łubkowski, M. Bednarczyk, K. Maślanka and M. Amanowicz, "QoS-aware end-to-end connectivity provision in a heterogenous military environment," 2013 Military Communications and Information Systems Conference, Saint-Malo, France, 2013, pp. 1-8. (Year: 2013).*
Z. Mammeri, "Reinforcement Learning Based Routing in Networks: Review and Classification of Approaches," in IEEE Access, vol. 7, pp. 55916-55950, 2019. (Year: 2019).*
G. Premsankar, B. Ghaddar, M. Di Francesco and R. Verago, "Efficient placement of edge computing devices for vehicular applications in smart cities," NOMS 2018—2018 IEEE/IFIP Network Operations and Management Symposium, Taipei, Taiwan, 2018, pp. 1-9. (Year: 2018).*
N. A. Pantazis, S. A. Nikolidakis and D. D. Vergados, "Energy-Efficient Routing Protocols in Wireless Sensor Networks: A Survey," in IEEE Communications Surveys & Tutorials, vol. 15, No. 2, pp. 551-591, Second Quarter 2013. (Year: 2013).*
G. Premsankar, B. Ghaddar, M. Di Francesco and R. Verago, "Efficient placement of edge computing devices for vehicular applications in smart cities," NOMS 2018—2018 IEEE/IFIP Network Operations and Management Symposium, Taipei, Taiwan, 2018, pp. 1-9, [now Efficient]. (Year: 2018).*
S. Bolettieri and R. Bruno, "QoS-Aware Data Management Mechanisms for Optimal Resource Utilisation in Crowd-Assisted Shared Sensor Networks," 2020 IEEE International Conference on Smart Computing (Smartcomp), Bologna, Italy, 2020, pp. 81-88. (Year: 2020).*
Aug. 17, 2022—(EP) Search Report—App 22157638.2.

* cited by examiner

400

500

NETWORK AWARE AND PREDICTIVE MOTION PLANNING IN MOBILE MULTI-ROBOTICS SYSTEMS

TECHNICAL FIELD

Aspects described herein generally relate to motion planning for autonomous systems and, more particularly, to techniques implementing wireless quality of service (QoS) information and machine learning to provide motion planning for autonomous agents.

BACKGROUND

The upcoming "Industry 4.0" paradigm is using computing, communication, and AI technologies to increase automation efficiency, reduce energy use, and improve safety for human workers. Autonomous Mobile Robots (AMRs) are key components in factories and warehouses to meet these needs. In accordance with such use cases, AMRs implement perception and manipulation jointly to accomplish a given task by navigating an environment while communicating and coordinating with one other as well as with a central entity. This coordination requires bounded latency, reliable communications, and computing power, which is typically handled in a networked environment that services the AMR environment. However, current techniques to support AMR path planning and navigation in such environments have been inadequate.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
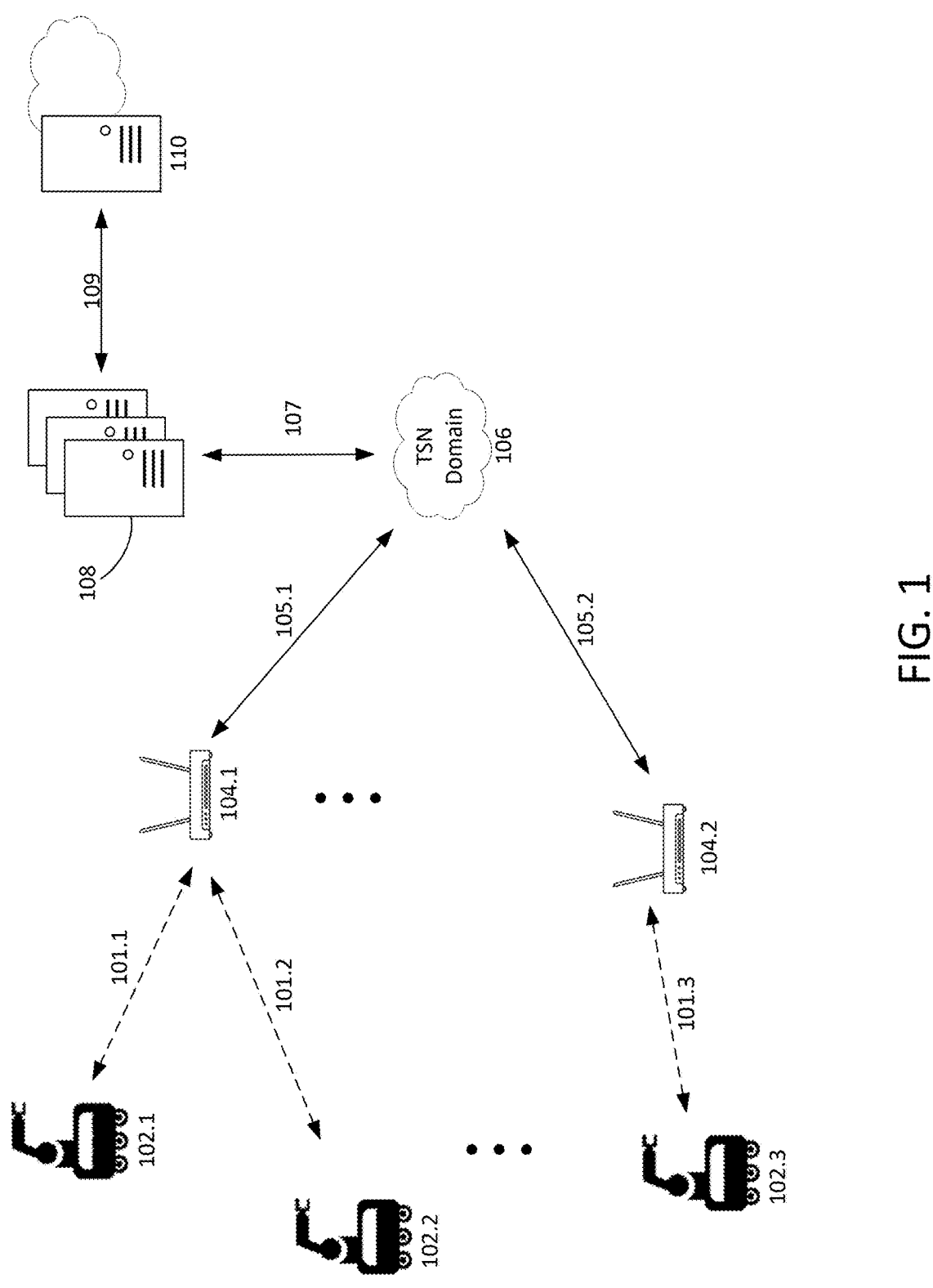
FIG. 1 illustrates a block diagram of an exemplary environment utilizing autonomous mobile robots (AMRs), in accordance with aspects of the disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Again, current techniques to current techniques to support AMR route planning and navigation in such environments have various drawbacks. For instance, networks implemented in AMR environments may include Wireless Time Sensitive Networking (WTSN) systems, such as infrastructure Wi-Fi and cellular-based network solutions that may be deployed in a warehouse or factory to facilitate AMR autonomous functions. However, one of the challenges associated with a WTSN infrastructure deployment is that the communication environment is highly dynamic and difficult to address with wireless planning alone. For instance, an AMR environment such as a factory or warehouse may use a wireless network that provides inconsistent levels of wireless communication performance due to changes in the environment, such as AMRs or other objects moving through the wireless communication medium. The wireless communication performance may also suffer from inconsistencies due to these changes over time, which may be characterized by increased latency, jitter, etc. due to factors such as cross channel interference, shielding, roaming, etc. Thus, in such use cases there exists a need to ensure a consistent level of connectivity, which is characterized by bounded latency and reliability.

Conventionally, a multi-robot path planning algorithm may be implemented for planning paths for all AMRs in a specific environment to enable the AMRs to complete tasks in an efficient manner. This is a function that is performed collaboratively by the AMRs and a central controller. Such path planning algorithms typically function by collaboratively updating a shared model of the environment, typically a graph representation of the region (e.g. operating environment) that is divided into smaller regions or cells, which considers dynamic obstacles and the probability of collisions so that each of the AMRs (or the controller) can formulate a path that allows each AMR to accomplish its task without interruption in the shortest time possible. However, conventional multi-robot path-planning and navigation algorithms, such as those used in existing Edge-computing enabled collaborative multi-robot systems, have key limitations which are addressed by the aspects described herein, as discussed in further detail below.

First, conventional path planning algorithms assume that the AMRs are always connected to the infrastructure with ideal wireless conditions, and do not consider the possibility of connectivity links failing (e.g. due to bad coverage, interference, or other environment related issues). Such conventional path-planning algorithms do not consider wireless channel conditions (e.g. signal strength, packet errors, jitter, signal-to-noise ratio, etc.) and wireless link performance between the AMRs and the wireless infrastructure during the path-planning process. As a result, the wireless Quality of Service (QoS) impacts not only the multi-robot coordination and navigation, but also the end use case. This is a significant issue as poor connectivity performance between AMRs and the infrastructure may affect the accuracy, speed, and success of the navigation tasks, which is collaboratively performed by the robots with support from a computing infrastructure, and thus impacts the overall efficiency of the particular application for a specific environment.

Second, navigation related perception-control functions (e.g. SLAM, Octomap generation, robot localization and pose estimation, multi-robot path planning, etc.) are largely executed using the limited computational power available locally on each robot. It is not possible to offload these time-sensitive navigation functions to infrastructure components because these functions are affected by uplink (UL)/downlink (DL) communication latencies (e.g. from robots to an Edge server) as well as by the computing latencies introduced by executing these computationally heavy functions. Furthermore, it is not currently possible to compensate for the communication and computation latencies that result from offloading navigation functions to infrastructure components. As a result, conventional robots cannot take advantage of the tremendous computing power of any on-site infrastructure components (e.g. an Edge server) and/or remote infrastructure components (e.g. cloud computing systems) to accelerate these functions and increase the speed of navigation.

The aspects described in further detail herein provide two solutions, which may be implemented individually or in combination, to address these aforementioned conventional AMR path planning issues. In doing so, the aspects described herein enable navigation for robotics systems to be more resilient to wireless network related issues, independently of the wireless systems operation. As further discussed herein, aspects include enhancing traditional path-planning algorithms to consider wireless QoS metrics and thus to identify the most optimal paths. Moreover, the aspects further include a system and mechanism to compensate for communication and computational latencies, making it feasible to offload time-sensitive navigation workloads to infrastructure components.

FIG. 1 illustrates a block diagram of an exemplary environment utilizing autonomous mobile robots (AMRs), in accordance with aspects of the disclosure. As shown in FIG. 1, the environment 100 supports any suitable number N of AMRs 102, with three AMRs 102.1-102.3 being shown for case of explanation. The environment 100 may be any suitable type of environment that uses the AMRs 102, such as a factory, warehouse, etc. The AMRs 102 may have any suitable type of design and function to communicate with other components of a network infrastructure as further disused below. The AMRs 102 may operate autonomously or semi-autonomously and be configured as mobile robots that move within the environment 100 to complete specific tasks. The AMRs 102 may include any suitable number and/or type of sensors to enable sensing of their surroundings and the identification of feedback regarding the environment 100. The AMRs 102 may further be configured with any suitable number and/or type of wireless radio components to facilitate the transmission and/or reception of data. For example, the AMRs 102 may transmit data indicative of current tasks being executed, location, orientation, velocity, trajectory, heading, etc. within the environment 100. As another example, the AMRs 102 may receive commands and/or planned path information from the computing device 108, which each AMR 102 may execute to navigate to a specific location within the environment 100. Although not shown in FIG. 1 for purposes of brevity, the AMRs 102 may additionally communicate with one another to determine information (e.g. current tasks being executed, location, orientation, velocity, trajectory, heading, etc.) with respect to the other AMRs 102, as well as other information such as sensor data generated by other AMRs 102.

Although the aspects described herein use examples of the environment 100 being a factory or warehouse that supports AMRs 102 operating within such an environment, this is by way of example and not limitation. The aspects as described herein may be implemented in accordance with any suitable type of environment and/or type of mobile agent. For instance, the environment 100 may be outdoors and be identified with a region such as a roadway that is utilized by autonomous vehicles. Thus, the aspects described herein may be applicable to AMRs as well as other types of autonomous agents that may operate in any suitable type of environment based upon any suitable application or desired function.

Again, the AMRs 102 operate within the environment 100 by communicating with the various components of the supporting network infrastructure. In an aspect, the network infrastructure may include any suitable number and/or type of components to support communications with the AMRs 102. For example, the network infrastructure may include any suitable combination of wired and/or wireless networking components that operate in accordance with any suitable number and/or type of communication protocols. For instance, the network infrastructure may include interconnections using wired links such as Ethernet or optical links, as well as wireless links such as Wi-Fi (e.g. 802.1 protocols) and cellular links (e.g. 3GPP standard protocols, LTE, etc.). The network infrastructure may be, for example, an access network, an edge network, a mobile edge computing (MEC) network, etc. In the example shown in FIG. 1, the network infrastructure includes one or more cloud servers 110 that enable a connection to the Internet, which may be implemented as any suitable number and/or type of cloud computing devices. The network infrastructure may additionally include a computing device 108, which may be implemented as any suitable number and/or type of computing device such as a server that may form part of a cellular node. In an aspect, the computing device 108 is implemented as an Edge server and/or Edge computing device.

In an aspect, the computing device 108 may communicate with the one or more cloud servers 110 via one or more links 109, which may represent an aggregation of any suitable number and/or type of wired and/or wireless links as well as other network infrastructure components that are not shown in FIG. 1 for purposes of brevity. For instance, the link 109 may represent additional cellular network towers (e.g. one or more base stations, eNode Bs, relays, macrocells, femtocells, etc.). In an aspect, the network infrastructure further includes a network domain 106, which may be implemented as any suitable type of domain that acts as a bridge between the computing device 108 (e.g. an Edge node) and the various AMRs 102 via the access points (APs) 104. The APs 104 which may be implemented in accordance with any suitable number and/or type of AP configured to facilitate communications in accordance with any suitable type of communication protocols. For example, the network domain 106 may be implemented as a time-sensitive network (TSN) domain that is connected to the computing device 108 via the link 107, which may be an Ethernet-based network and link, for example. Continuing this example, the APs 104 may be implemented as wireless TSN (WTSN) access points that form a TSN network together with the TSN domain 106 that is synchronized to an accurate clock source. The network infrastructure may include any suitable number of APs 104, with two being shown in FIG. 1 for purposes of brevity. In the example shown FIG. 1, the APs 104.1, 104.2 service the AMRs 102 to facilitate wireless communications between the AMRs 102 and the computing device 108 (or other suitable network infrastructure component such as the cloud server(s) 110 for instance). Thus, the APs 104 may be configured to support communications in accordance with any suitable number and/or type of communication protocols, such as an Institute of Electrical and Electronics Engineers (IEEE) 802.11 Working Group Standards, the most recent version at the time of this writing being IEEE Std 802.11™ -2020, published Feb. 26, 2021 and/or the IEEE 802.1 TSN networking group protocols, the most recent version of which at the time of this writing being the IEEE Std 802.1AS-2020: IEEE Standard for Local and Metropolitan Area Networks-Timing and Synchronization for Time-Sensitive Applications, published Jun. 19, 2020. Such TSN standard protocols mat for example allow TSN capabilities to be mapped from Ethernet to Wi-Fi without architecture changes or protocol translation gateways. Alternatively, the APs 104 may operate in accordance with other types of communication standards other than the 802.11 Working Group, such as cellular based standards (e.g. "private cellular networks) or other local wireless network systems, for instance. In still other alternative aspects, the AMRs 102 may communicate directly with the computing device 108 or other suitable components of the network infrastructure without the need to use the APs 104.

In any event, the AMRs 102 may communicate with the computing device 108 (or other suitable network infrastructure component such as the cloud server(s) 110 for instance) to realize the various aspects as described herein. Thus, the network infrastructure may include any suitable number and combination of wired and/or wireless devices and accompanying links. In the example shown in FIG. 1, the links 105.1, 105.2, 107, and 109 are solid lines and thus represent wired connections, whereas the links 101.1, 101.2, 101.3 are illustrated with broken lines and thus represent wireless connections.

In the environment 100 as shown in FIG. 1, the computing device 108, which again may be implemented as an Edge computing device, server, node, etc., is configured to communicate with each of the AMRs 102 to receive data from the AMRs 102 and to transmit data to the AMRs 102. This functionality may be additionally or alternatively be performed by other network infrastructure components that are capable of communicating directly or indirectly with the AMRs 102, such as the one or more cloud servers 110, for instance. However, the local nature of the computing device 108 may provide additional advantages in that the communication between the computing device 108 and the AMRs 102 may occur with reduced network latency. Thus, the aspects described herein use the computing device 108 as the primary example when describing this functionality, although it is understood that this is by way of example and not limitation.

The computing device 108 may thus receive sensor data from each for the AMRs 102 via the APs 104 and use this sensor data, together with other information about the environment 100 that is already known (e.g. data regarding the size and location of static objects in the environment 100), to generate a shared environment model that represents the environment 100. This shared environment model may be represented as a navigation grid having cells of any suitable size and/or shape, with each cell having specific properties with respect to the type of object contained (or not contained) in the cell, whether an object in the cell is static or moving, etc., which enables the environment model to accurately depict the nature of the environment 100. As an example, grid cells may be squares of predetermined sizes (e.g. 80 mm) based upon a desired granularity for a particular environment and accompanying application. The environment model may thus be dynamically updated by the AMRs 102 directly and/or via the computing device 108 on a cell-by-cell basis as new sensor data is received from the AMRs 102. The updates to the shared environment model thus reflect any recent changes in the environment 100 such as the position and orientation of each of the AMRs 102 and other obstacles that may change in a dynamic manner within the environment 100 (e.g. people, forklifts, machinery, etc.). The shared environment model may additionally or alternatively be updated based upon data received from other sensors or devices within the environment 100, such as stationary cameras for example, which may enable a more accurate depiction of the positions of the AMRs 102 without relying of AMR communications.

Each AMR 102 executes a path planning algorithm and uses the shared environment model at a particular time (e.g. the most recently constructed) to calculate navigational paths for each AMR 102. These navigational paths include sets of intermediate points or "waypoints" that define an AMR trajectory within the environment 100 between a starting point (e.g. its current location in the environment 100) to a destination within the environment 100. That is, the waypoints indicate to the AMRs how to execute a planned navigational path to proceed to each of the intermediate points at a specific time until a destination is reached. Thus, given the time-sensitive nature of the navigation of the AMRs 102, the advantages of the APs 104 being implemented as part of a WTSN are illustrated, as a synchronized high precision common clock is required to ensure accurate autonomous control of the AMRs 102.

Thus, existing navigation applications implemented by the AMRs 102 are completely dependent on the wireless network connectivity, and if the wireless network (or other network infrastructure components that operate in conjunction with the wireless network) fail, then the AMR navigation application also fails. However, and as noted above, conventional path planning algorithms do not use information that characterize or otherwise consider the performance of the underlying wireless network (e.g. the performance of the wireless network serviced by the APs 104.1, 104.2 in this example). Instead, the conventional approach is to typically over engineer and over provision the wireless infrastructure to make it reliable enough for the AMRs 102 to operate, and then tackle corner cases by a set of fail-safe rules. In other words, conventional path-planning algorithms usually calculate a navigation path that optimizes for the shortest-path or the fastest-path within the environment 100 but does not optimize for the reliability from a wireless network perspective. This causes issues as the computed navigation paths (or trajectories) for each AMR 102 may not be reliable, leading to failure and/or degradation of a navigation task due to poor wireless connectivity or QoS while the AMR 102 travels along a calculated navigational path and attempts to communicate with the computing device 108.

Thus, and as further discussed below with reference to FIGS. 2A-2C for instance, the aspects described herein address these shortcomings by enhancing path-planning algorithms with a mechanism to dynamically monitor, model, and enrich the environment model of the environment 100 using QoS information at each cell or waypoint location in the navigation grid. This "enriched" environment model that is constructed using the QoS information is then used by the AMRs 102 (or, in other aspects discussed in further detail herein, offloaded and used by the computing device 108) as part of the path-planning algorithm to calculate "network-efficient" navigational paths for the AMRs 102 to thus improve the overall efficiency of navigation tasks in the environment 100.

General Operation of the System Implemented in the Environment 100

With reference to the computing device 108, the computing device 108 may further include communication circuitry configured to receive quality of service (QoS) metrics from an autonomous agent 102 operating within the environment 100 of the wireless network, the QoS metrics corresponding to the one or more wireless links 105 and are generated by the autonomous agent 102 via monitoring of the one or more wireless links; and one or more processors configured to generate an environment model using the QoS metrics, the environment model representing a model of the environment 100 for navigation path planning of the autonomous agent within the environment. The computing device 108 may comprise an Edge network computing device. The environment model may further comprise a set of grid cells, and the one or more processors may be configured to aggregate the QoS metrics received from each of the plurality of autonomous agents to calculate an expected QoS score per grid cell that represents the expected QoS level in a respective grid cell. The one or more processors may be further configured to, in addition or in combination with any one of the features mentioned in this paragraph, calculate the expected QoS per grid cell score using a weighted averaging function, with more recent values being assigned a higher weight. The navigation path may further comprise, in addition or in combination with any one of the features mentioned in this paragraph, a chain of connected grid cells from among the plurality of grid cells that indicate a path within the environment for the autonomous agent to traverse to reach a destination grid cell. The one or more processors may further be configured, in addition or in combination with any one of the features mentioned in this paragraph, to calculate the environment model that incorporates the expected QoS score per grid cell. The QoS metrics may include at least one of: latency, receive signal strength indicator (RSSI) values, packet error rate (PER), jitter, bit error rate (BER), signal to noise ratio (SNR), signal to noise plus interference ratio (SINR), carrier to interference plus noise ratio (CINR), or modulation and coding schemes (MCS) histogram data.

With reference to the autonomous agents 102, the autonomous agents 102 may further include communication circuitry configured to enable the autonomous agent 102 to communicate with the computing device 108 via the wireless network using one or more wireless links 105 within the environment 100, and one or more processors configured to monitor the one or more wireless links and to generate quality of service (QoS) metrics with respect to the one or more wireless links from the monitoring, the communication circuitry being further configured to transmit the QoS metrics to the computing device 108 for the generation of the environment model associated with the environment 100, and the one or more processors being configured to calculate a navigation path for the autonomous agent 102 in accordance with the environment model for the autonomous agent 102 to navigate to a destination within the environment 100. The communication circuitry may be configured to communicate with an Edge network computing device that comprises the computing device 108. The environment model may, in addition or in combination with any one of the features mentioned in this paragraph, comprise a set of grid cells, and incorporate an expected QoS score per grid cell from an aggregation of QoS metrics transmitted by each of the plurality of autonomous agents 102. The expected QoS per grid cell score may be further based upon a weighted averaging function, with more recent values being assigned a higher weight. Furthermore, the navigation path comprise, in addition or in combination with any one of the features mentioned in this paragraph, a chain of connected grid cells from among the plurality of grid cells that indicate a path within the environment for the autonomous agent to traverse to reach a destination grid cell. Moreover, the one or more processors may be configured to, in addition or in combination with any one of the features mentioned in this paragraph, calculate the navigation path by iteratively executing a cost function that uses the expected QoS score per grid cell and an estimate of a possible QoS score from a grid cell in the navigation path to reach a destination grid cell. Still further, the QoS metrics include at least one of: latency, receive signal strength indicator (RSSI) values, packet error rate (PER), jitter, bit error rate (BER), signal to noise ratio (SNR), signal to noise plus interference ratio (SINR), carrier to interference plus noise ratio (CINR), or modulation and coding schemes (MCS) histogram data.

With reference to the computing device 108, the computing device 108 may further include communication circuitry configured to receive, via a wireless network, sensor data from an autonomous agent 102 operating within the environment 100 after the sensor data is transmitted by the autonomous agent 102 in accordance with a communication delay; one or more processors configured to calculate a navigation path for the autonomous agent 102 to reach a destination within the environment 100 using the sensor data, the navigation path comprising a plurality of waypoints, with the calculation being associated with a computing delay; and a waypoint correction neural network configured to (i) receive the plurality of waypoints, (ii) predict a trajectory delay of the autonomous agent 102 caused by the communication delay and the computing delay, and (iii) calculate a plurality of delay-corrected waypoints, the communication circuitry being further configured to transmit the plurality of delay-corrected waypoints to the autonomous agent 102 for the autonomous agent 102 to traverse the navigation path. The computing device may be an Edge network computing device. Furthermore, the waypoint correction neural network may, in addition or in combination with any one of the features mentioned in this paragraph, comprise a deep neural network implementing a long short-term memory (LSTM) architecture. Moreover, the waypoint correction neural network may, in addition or in combination with any one of the features mentioned in this paragraph, be configured to calculate the plurality of delay-corrected waypoints further using a predicted delay associated with downlink communication latency with respect to a time required to transmit the plurality of delay-corrected waypoints to the autonomous agent. Furthermore, the autonomous agents 102 and the one or more processors may, in addition or in combination with any one of the features mentioned in this paragraph, be configured to calculate the navigation path for the autonomous agent 102 using an environment model comprising a set of grid cells having an expected QoS score per grid cell that is calculated using an aggregation of a respective set of QoS metrics received from each one of the autonomous agents 102, the QoS metrics corresponding to one or more wireless links used for communications between the computing device 108 and the plurality of autonomous agents 102. The QoS metrics may include at least one of: latency, receive signal strength indicator (RSSI) values, packet error rate (PER), jitter, bit error rate (BER), signal to noise ratio (SNR), signal to noise plus interference ratio (SINR), carrier to interference plus noise ratio (CINR), or modulation and coding schemes (MCS) histogram data. Still further, in addition or in combination with any one of the features mentioned in this paragraph, the plurality of waypoints may form the navigation path between a starting location of the autonomous agent and the destination, each one of the plurality of waypoints representing a location within the environment 100 that the autonomous agent 102 is to traverse at a respective traversal time, and the time required to perform the calculation of the plurality of waypoints is associated with the computing delay. Also, in addition or in combination with any one of the features mentioned in this paragraph, the waypoint correction neural network may be configured to calculate the plurality of delay-corrected waypoints to compensate for the trajectory delay such that the plurality of delay-corrected waypoints are synchronized with a trajectory of the autonomous agent 102 within the environment 100 when the autonomous agent 102 executes the plurality of waypoints.

Multi-Agent Path-Planning Based on Wireless QoS

Figure 2A:
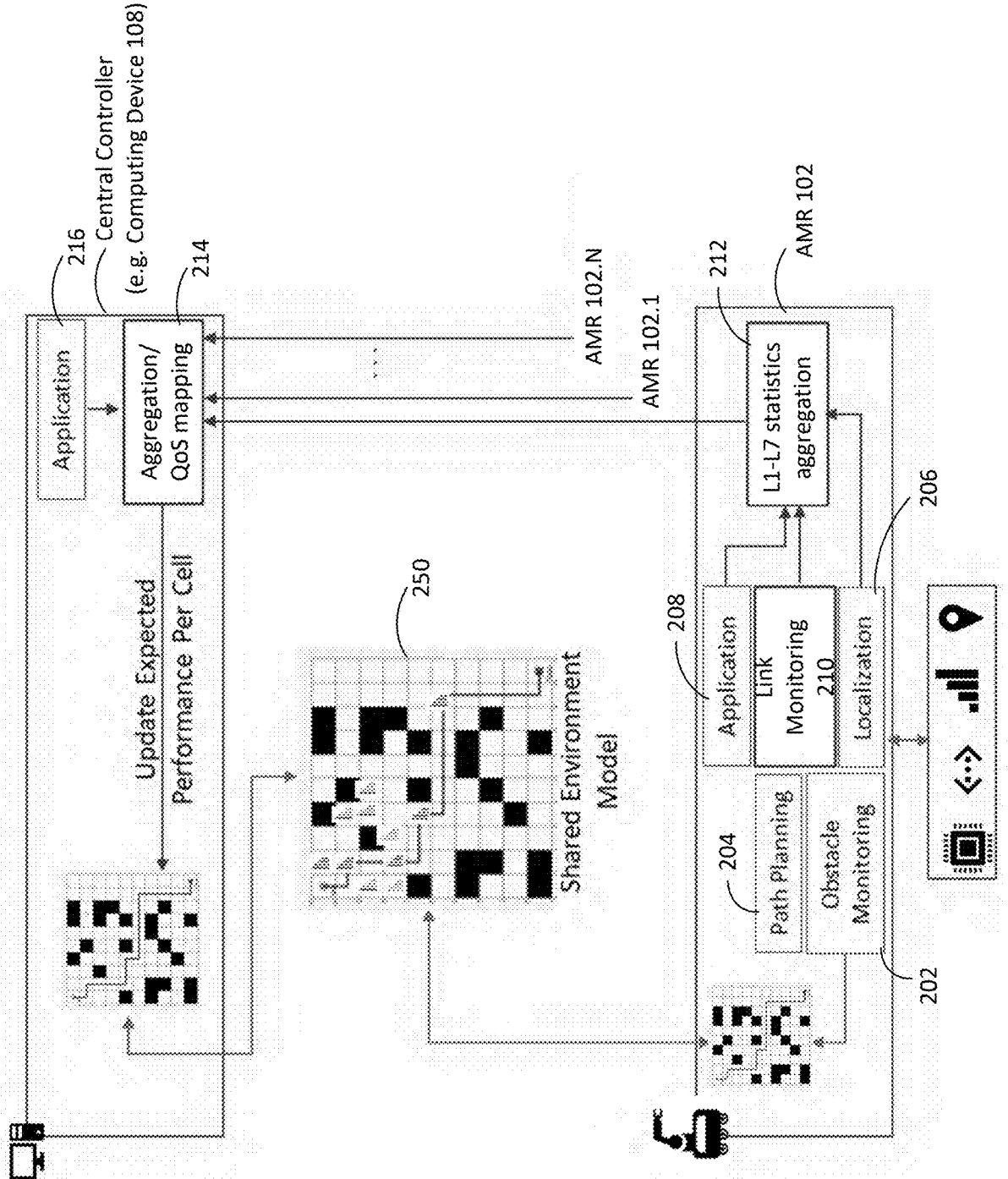
FIG. 2A illustrates a block diagram of multi-agent path planning process flow based on wireless Quality of Service (QoS) information, in accordance with aspects of the disclosure.

FIG. 2A illustrates a block diagram of multi-agent path planning process flow based on wireless Quality of Service (QoS), in accordance with an aspect of the disclosure. FIG. 2 illustrates additional detail with respect to the communications between an AMR 102 and the computing device 108 as shown in FIG. 1, with additional detail shown regarding the various functions performed by the AMR 102 and the computing device 108. FIG. 2A also shows addition detail regarding now the QoS information is used to update the shared environment model 250, which is used for navigational path planning. For example, in the environment 100 as shown in FIG. 1, each AMR 102 charts out a path to follow to accomplish a task it has been assigned by a central controller, which may be implemented by the computing device 108 for example, or any other suitable component of the network infrastructure and/or components connected to the network infrastructure, in various aspects.

For purposes of brevity, FIG. 2A illustrates the details of link monitoring and QoS metric reporting for a single AMR 102, although the process described herein is understood to be performed by each of the AMRs 102 within the environment 100 or any subset thereof. In an aspect, the calculation of the navigational path is performed by each AMR 102 within the environment 100 to navigate to a destination within the environment 100 to accomplish a specific task assigned to each AMR by a central controller (e.g. the computing device 108 in this example), which is responsible for task planning. Again, for the purpose of providing the shared environment model 250, the environment 100 is divided into smaller regions represented as a grid, with the regions referred to as grid cells or simply "cells." Each of the AMRs 102 collaboratively update and share information and updates dynamically discovered pertaining to each of these cells, which are generally related to any dynamic obstacles and conflicting navigation paths. The AMRs 102 transmit any identified updates to the shared environment model 250 regarding the environment 100.

Information dynamically discovered by the AMRs 102 may be, for instance, a result of each AMR 102 locally processing its sensor data. The updated shared environment model 250 may be maintained by the central controller and shared with each of the AMRs 102 as well being used for planning tasks. Thus, at any given point in time, the AMRs 102 may be attempting to determine which cells to add to a particular route (e.g. a planned path) or move to so that its assigned task may be accomplished in the most efficient manner. In other words, because of the dynamic nature of the environment 100, each AMR 102 calculates its own navigation path in a continuous and iterative manner using iterative updates that are provided to the shared environment model 250. Thus, the shared environment model 250 may be stored in the computing device 108 and/or locally in a memory associated with or otherwise accessed by each one of the AMRs 102. Additionally or alternatively, the shared environment model 250 may be stored in any other suitable components of the network infrastructure or devices connected thereto. In any event, the AMRs 102 may iteratively receive or otherwise access the shared environment model 250, including the most recent updates, to perform navigation path planning functions as discussed herein. The shared environment model 250 may thus be updated as new sensor data is received by the central controller and processed and/or processed locally by the AMRs 102, and be performed in a periodic manner or in accordance with any suitable schedule.

In an aspect, each of the AMRs 102 may implement a suite of onboard sensors to generate sensor data indicative of the location, position, velocity, heading orientation, etc. of the AMR 102 within the environment 100. These sensors may be implemented as any suitable number and/or type that are generally known and/or used for autonomous navigation and environmental monitoring. Examples of such sensors may include radar, LIDAR, optical sensors, cameras, compasses, gyroscopes, positioning systems for localization, accelerometers, etc. Thus, the sensor data may indicate the presence of and/or range to various objects near each AMR 102. Each AMR 102 may additionally process this sensor data to identify obstacles or other relevant information within the environment 100 that will impact the shared environment model 250. The AMRs 102 may then use the shared environment model 250 to iteratively calculate respective navigation paths, as further discussed herein.

Each AMR 102 may also be implemented with any suitable number and/or type of hardware and software configuration to facilitate autonomous navigation functions within the environment 100, including known configurations. For example, each AMR 102 may implement a controller that may comprise one or more processors or processing circuitry, which may execute software that is installed on a local memory to perform various autonomous navigation-related functions. For example, and as shown in FIG. 2A, the obstacle monitoring processing block 202 enables the AMR 102 to use sensor data to detect and optionally classify obstacles within the environment 100, and then use this information to transmit updates with respect to the shared environment model 250. The localization processing block 206 further enables the AMR 102 to use onboard sensors to perform pose estimation and/or to identify e.g. a position, orientation, velocity, direction, and/or location of the AMR 102 within the environment 100, which may also be used to transmit updates to the shared environment model 250 with respect to the AMRs position and trajectory within the environment 100 as the AMR 102 moves along a particular planned path. The AMR 102 further includes a path planning processing block 204 that may execute path planning functionality for navigation-related functions (e.g. SLAM, octomap generation, multi-robot path planning, etc.).

Each AMR 102 may thus execute an application 208 that enables the communication functions and autonomous navigation and control functions to be realized, which may be customized to a specific type of AMR, its capabilities, a specific application, and the environment 100. For example, the application 208 may enable the AMR 102 to generate control commands and execute navigation functions in accordance with a calculated panned path such as steering, speed control, motor or servo actuation, etc. As additional examples, one or more of the various processing blocks and applications shown in FIG. 2A (e.g. the obstacle monitoring block 202, the path planning processing block 204, the localization processing block 206, the application 208, the link monitoring processing block 210 and/or the L1-L7 statistics aggregation block 212 may be implemented by modifying an existing control application and/or firmware implemented by the AMRs 102, as customized software applications and/or firmware, and/or supplemental (e.g. additional) applications and/or firmware in addition to the currently used control application(s) implemented by the AMRs 102. In this way, the AMR 102 may collect link-monitored QoS metrics via the link monitoring processing block 210 and additionally or alternatively collect application-based QoS metrics relevant to the performance of the AMR 102 (e.g. L4 metrics, as noted in further detail herein) based upon the execution and feedback provided by the application 208. Such a customized application may be particularly useful to ensure that the link-monitored QoS metrics and application-based QoS metrics (collectively referred to herein as "QoS metrics") are appropriately tagged with the location and time corresponding to where and when the performance metrics were measured or otherwise obtained.

In an aspect, each AMR 102 may be configured to perform link monitoring via the link monitoring processing block 210 as shown in FIG. 2A for instance. Again, this may be implemented, for example, by updating the software and/or firmware implemented by the AMRs 102 to add this capability to existing AMRs 102 that may be in use in the environment 100. Additionally or alternatively, hardware may be added to the AMRs 102 to facilitate this functionality, although this is not required to enable the aspects as described herein. For example, and as shown in further detail in FIG. 2A, each AMR 102 may monitor the wireless link(s) used to communicate with the computing device 108 or other network infrastructure components, as the case may be. To provide an illustrative example with reference to FIG. 1, this may include the AMR 102.1 monitoring the wireless link 101.1, the AMR 102.2 monitoring the wireless links 101.1, 101.2, the AMR 102.3 monitoring the wireless link 101.3, etc.

Aspects thus include each AMR 102 performing wireless link monitoring to collect and aggregate QoS metrics regarding the wireless link(s) that are monitored as part of this process, which are then transmitted to the central controller (e.g. the computing device 108 in this example). The central controller may implement an aggregation/QoS mapping processing block 214 to map the aggregated QoS metrics received from each of the AMRs 102 within the environment 100 to the shared environment model 250 on a per cell basis, which may be updated as new data is received, allowing the AMRs 102 (or the central controller 108 when this functionality is offloaded) to implement the QoS metrics as part of their path planning algorithms. Thus, by collecting the QoS metrics in this way, aspects include enhancing conventional path-planning algorithms with a mechanism to dynamically monitor, model, and enrich the shared environment model 250 of the environment 100 with QoS information at each cell location in the navigation grid, which may be identified with a respective waypoint in the planned path of each AMR 102. As discussed in further detail below, each AMR 102 may then use this "enriched" shared environment model 250 to identify network-efficient navigation paths for AMRs 102 to traverse, thereby improving the overall efficiency of navigation tasks.

For example, and with continued reference to FIG. 2A, each AMR 102 may utilize link monitoring to enhance their own path planning calculations. To do so, each AMR 102 may perform wireless link monitoring to determine and aggregate the performance of the wireless link(s) at any point within the environment 100. In an aspect, each AMR 102 may perform the link monitoring as shown in FIG. 2A using the existing hardware within the AMR 102, such as data obtained from interfaces provided to the wireless cards or modems implemented as part of the AMR 102, for instance, that enable wireless communication with the APs 104. Although referred to herein as QoS metrics herein, the metrics may be any suitable type of metric that may indicate wireless link performance at a specific time and location within the environment 100. Some non-limiting examples of QoS metrics, which may be determined via each AMR 102 using link monitoring identified as the processing block 210 as shown in FIG. 2A include latency (e.g. uplink and/or downlink latencies for the monitored wireless links) receive signal strength indicator (RSSI) values, packet error rate (PER), jitter, bit error rate (BER), signal to noise ratio (SNR), signal to noise plus interference ratio (SINR), carrier to interference plus noise ratio (CINR), modulation and coding schemes (MCS) histogram data (e.g. Open Systems Interconnection (OSI) model layer 1 (L1) and layer 2 (L2) statistics), etc.

In an aspect, each AMR 102 may execute the link monitoring function at any suitable time and for any suitable length of time such as while stationary, while traversing a planned path, while awaiting further instructions, etc. The AMR 102 may also record or otherwise store time and localization data (e.g. a location and/or orientation) of the AMR 102 that is correlated to the measured QoS metrics derived via link monitoring using the AMRs existing localization functions. In other words, aspects include each AMR 102 aggregating the QoS metrics on a per time and per location basis within the environment 100.

Aspects thus include each AMR 102 performing statistics aggregation to provide a packaged set of QoS metrics (e.g. an aggregation of the collected, measured, or otherwise obtained QoS metrics as described herein, which may be from the use of link monitoring and/or derived via the application 208) as part of periodic data transmissions to the central controller, with the set of QoS metrics being tagged or otherwise correlated to a specific location within the environment 100 and a time when the QoS metrics were collected. Again, in addition to the link-monitored QoS metrics derived from the link monitoring with respect to the communication stack layers L1 (e.g. PHY), L2 (e.g. MAC), and L3, aspects further include each AMR 102 additionally or alternatively obtaining application-based QoS metrics of higher application communication stack layers L4-L7 using application-related data derived from the execution of the application 208 used to control the functions of the AMR 102. This may include, for instance, any suitable type of statistic reported or derived from the executed control application, which may function as feedback regarding wireless network performance. Examples include application data obtained with respect to the AMR 102 performing communications while moving to a location, performing a task, etc.

Thus, the L1-L7 statistics aggregation processing block 212 as shown in FIG. 2A enables each AMR 102 to aggregate QoS metrics with respect to the executed control application (the application-based QoS metrics) as well as those measure via wireless link monitoring (the link-monitored QoS metrics) as a function of location and correlated to a specific time. Thus, the AMR 102 facilitates the aggregation of various QoS metrics across several communication stack layers, and tags these QoS metrics with a location within the environment 100 that is quantized to a cell within the shared environment model 250. In this way, the QoS metrics may be aggregated from any suitable layers (e.g. all) layers of the communication stack (e.g. L1-L7). By utilizing control application data in this way, aspects include the AMR 102 facilitating an interface for the control application that is running in the AMR 102 to report any relevant L4-L7 metrics (metrics collected at application level to protocol level) to be aggregated per location (e.g. cell) and time. Such application-based QoS metrics may include one or more measures of the performance of the AMR 102 as perceived and tracked by the control application itself.

To accurately update the shared environment model 250 using the aggregated QoS metrics, the central controller predicts the network performance at each cell within the environment model and then maps this performance indicator to each cell's location. An example of a shared environment model 250 with such network performance information per cell is shown in FIG. 2C, with only a portion of the cells being mapped in this manner for purposes of brevity. To do so, the central controller utilizes a history of reported QoS information from the various cells to construct a radio map or fingerprint of network performance within the environment 100 as experienced by and reported by the AMRs 102. Aspects include the central controller implementing the aggregation and mapping processing block 214 to provide updates to the shared environment model 250 as discussed herein using the aggregated QoS data (e.g. the QoS metrics received from each of the AMRs 102 within the environment 100). This includes, for instance, the central controller aggregating the received QoS statistics reported by each AMR 102 on a per cell basis by using the location and time correlated data provided by each AMR 102 as discussed above.

In an aspect, the central controller calculates the quantized expected QoS level using the QoS metrics from all AMRs 102 operating within the environment 100 to calculate a QoS score (or simply "score" as used herein) for each cell of the environment model that represents the expected QoS level in that given cell. This score is dynamic in nature, and reflects an expected network performance score that is refined over time. Aspects include the central controller averaging the score using a weighted averaging function, for instance, with newer (i.e. more recent) values being assigned a higher weight. As an example, such a weighted average function may calculate a score that is attributed to each cell in the environment model within a range of 1 to 100, although this is by way of example and not limitation and any suitable type of function may be used to calculate a score having any suitable range, which may be numeric or non-numeric in nature.

In various aspects, the central controller may calculate the QoS score in a task dependent manner. In other words, the received and aggregated QoS metrics from each of the AMRs 102 may be used to calculate the QoS score on a per cell basis within the shared environment model 250 based upon a task that an AMR 102 is assigned to perform with respect to a planned path and/or a task that is currently being performed. As an example, a QoS score calculation may include a weighted combination of the monitored QoS metrics such as PER, jitter, CINR, aggregated MCS, and latency (e.g. downlink latency, uplink latency, or both). The QoS metrics shown in Equation 1 below are only an example set of QoS metrics used to calculate a corresponding QoS score value, and aspects include any suitable number of QoS metrics being implemented for this purpose, without or without correspondent weighting values or weighting values that may represent alternative values or be based upon other factors in addition to or instead of AMR tasks.

$$QoS_{(task)} = PER \cdot W_{(task,per)} + \text{Jitter} \cdot W_{(task,j)} + CINR \cdot W_{(task,c)} + Ag.MCS \cdot W_{(task,MCS)} + \text{Latency} \cdot W_{(task,latency)},$$

<div align="right">Eqn. 1:</div> where $W_{(task, x)}$ represents a weight that determines how much correlation a specific metric x has with respect to the performance of the specific task "task" at hand. Such weights may be, for instance, empirically calculated using simulations, sample runs, etc., and thus represent predetermined weightings that are correlated to the specific AMR task to be executed. Continuing this example, using normalized values for each of these metrics, any suitable range of scores may thus be derived on a per cell basis for a specific task to be executed by evaluating Equation 1 above, such as a range between 1 and 100 for instance. In an aspect, the weight parameter identifies how much the task at hand is affected or degraded by a degradation in a corresponding QoS metric. In other words, the $QoS_{(task)}$ is specific to a task but also represents an overall measure of QoS performance of a particular cell, which may also be calculated by aggregating the task specific QoS from each of the AMRs 102 in this manner.

Figure 2B:
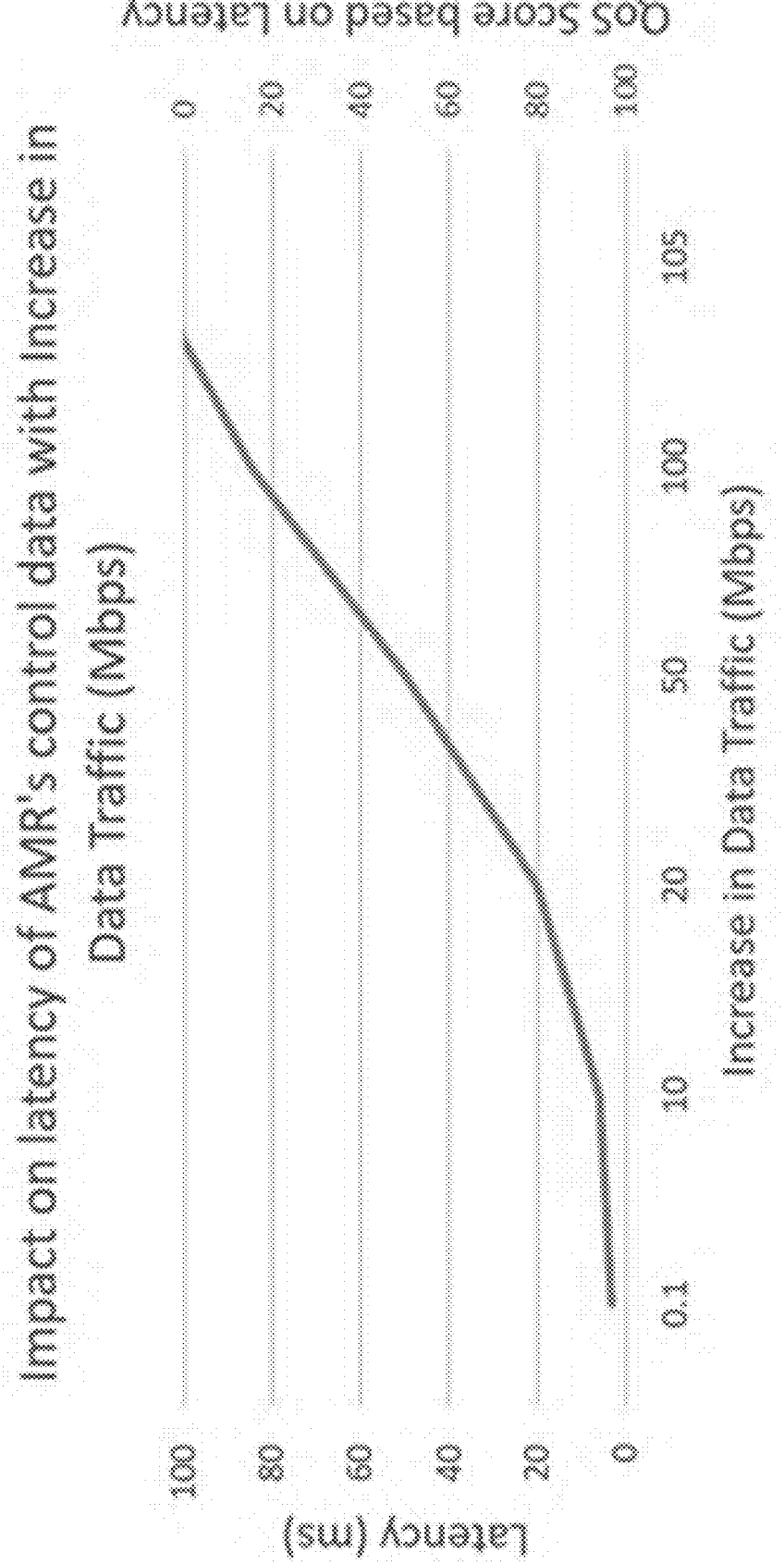
FIG. 2B illustrates an exemplary graph showing the relationship between a latency QoS metric and a resulting QoS score, in accordance with aspects of the disclosure.

FIG. 2B provides an example of the effect of the latency QoS metric (e.g. uplink latency, downlink latency, or combination of both) on a resulting QoS score that considers only this QoS metric for ease of explanation. Again, the QoS score may be calculated using a weighted or non-weighted sum of any suitable combination of QoS metrics received form the AMRs 102. As shown in FIG. 2B, the latency QoS metric increases with increasing data traffic in a particular cell, thus resulting in a lower QoS score.

Each AMR 102 (or the central controller in other aspects) executes a path planning algorithm to calculate waypoints, as discussed in further detail herein, which may be referred to as control data or waypoint data. This waypoint data may be exchanged by each of the AMRs 102 with one another and/or with the central controller, and is impacted depending upon the congestion in the network traffic. For instance, as more AMRs 102 move through cells that have dense network traffic, the latency of the control data for that particular AMR 102 increases many fold. FIG. 2C shows the relationship between the QoS latency metric and an increase in data traffic. Apart from latency, there are other network parameters such as PER, jitter etc., which are also affected as the data traffic in a particular cell increases. Thus, depending upon the type of task that an AMR 102 is performing, and a desired or target QoS score, aspects include the central controller assigning cells through which the AMRs 102 may navigate by knowing each cell's data traffic and the possible impact on the QoS score when an AMR 102 enters that cell. For instance, an AMR task to reach a goal station and remain stationary would require a lower QoS score compared to an AMR 102 that needs to deliver an item to a customer station or perform a collaborative task.

Turning now to the path planning algorithm executed by the AMRs 102 to perform autonomous navigation using the shared environment model 250, this is conventionally performed iteratively via the controller implemented via each AMR 102. In particular, conventionally AMRs 102 determine a planned path to a destination cell or goal cell from its starting point by iteratively applying a cost function across all immediate neighboring cells of the shared environment 250 until a goal cell (cgoal) or destination cell is reached. An example of such a cost function is provided below and expressed as Equation 2:

$$\text{argmin}_{c \in N}(g(c)+h(c,\text{cgoal})),\qquad\qquad\text{Eqn. 2:}$$

where c refers to a cell in the immediate neighborhood N of the AMR 102 (e.g. adjacent cells), g(c) is the cost of a path to an adjacent cell, and h(c, cgoal) represents a projected estimated cost from the adjacent cell to the destination or goal cell.

In other words, conventional path planning algorithms used by the AMRs 102 incrementally plot out a planned path one cell at a time, repeating this process as the algorithm advances the AMR 102 to the next adjacent cell. The resulting planned path may thus be represented as a chain of connected cells that are a subset of the cells represented in the shared environment model 250. In other words, the path planning algorithm functions to identify which cell in the current neighborhood of cells adjacent to the AMR 102 to add to its path so that the total cost to the goal cell is minimal. That is, after the algorithm selects a cell to add, the entire process is repeated from this new cell until the new cell added becomes the goal cell. Thus, conventional path planning algorithms function to repeat the cell identification and selection process for various combinations of cells from the current starting point of the AMR 102 to a destination or goal cell until an optimized path is calculated in accordance with the cost function. The optimized planned path calculated in this way thus yields a set of intermediate waypoints representing each of the cells that the AMR 102 is to traverse to reach the goal cell from its starting location.

In various aspects, to incorporate the QoS expectation and the performance of the wireless links into such a path planning algorithm, the cost function implemented by the AMRs 102 is modified to incorporate the aforementioned QoS scores that are calculated by the central controller and mapped to each cell of the shared environment model 250 as noted above. An example of such a modified cost function is represented below in Equation 3 as follows:

$$\text{argmin}_{c \in N}(g(c)+h(c,\text{cgoal})-\beta S(c)),\qquad\qquad\text{Eqn. 3}$$

The cost function represented in Equation 3 is similar to the conventional cost function represented in Equation 2, with the term g(c)+h(c, cgoal) representing the same costs as noted above. However, the modified cost function represented in Equation 3 includes an additional term $\beta S(c)$. An example of the new function S(c) may be further represented below in Equation 4 as follows:

$$S(c)=(g_{QoS}(c)+h_{QoS}(c,\text{cgoal})),\qquad\qquad\text{Eqn. 4:}$$

where $g_{QoS}(c)$ represents the aggregation of the QoS scores from each of the AMRs 102 operating within the environment 100 to a particular cell c in the planned path, whereas the term $h_{QoS}(c, \text{cgoal})$ represents the estimate of the QoS score possible from this cell in the planned path to the goal cell.

In an aspect, the cost function also includes a weighting parameter $\beta$, which balances the path planning cost g(c)+h (c, cgoal) with the QoS cost S(c) in the selection of the optimal path. In this way, each time the path planning function (e.g. algorithm) is executed, a decision is made with respect to the next cell or region to add to the path, the expected level of performance from the communication infrastructure is taken into account, and a cell is selected along the planned path that maximizes or optimizes this performance for the entire path to the goal cell. The weighting parameter $\beta$ may be used to fine tune the planned path algorithm to more heavily consider the new term S(c) or to ignore it completely, based upon the particular application and environment.

Figure 2C:
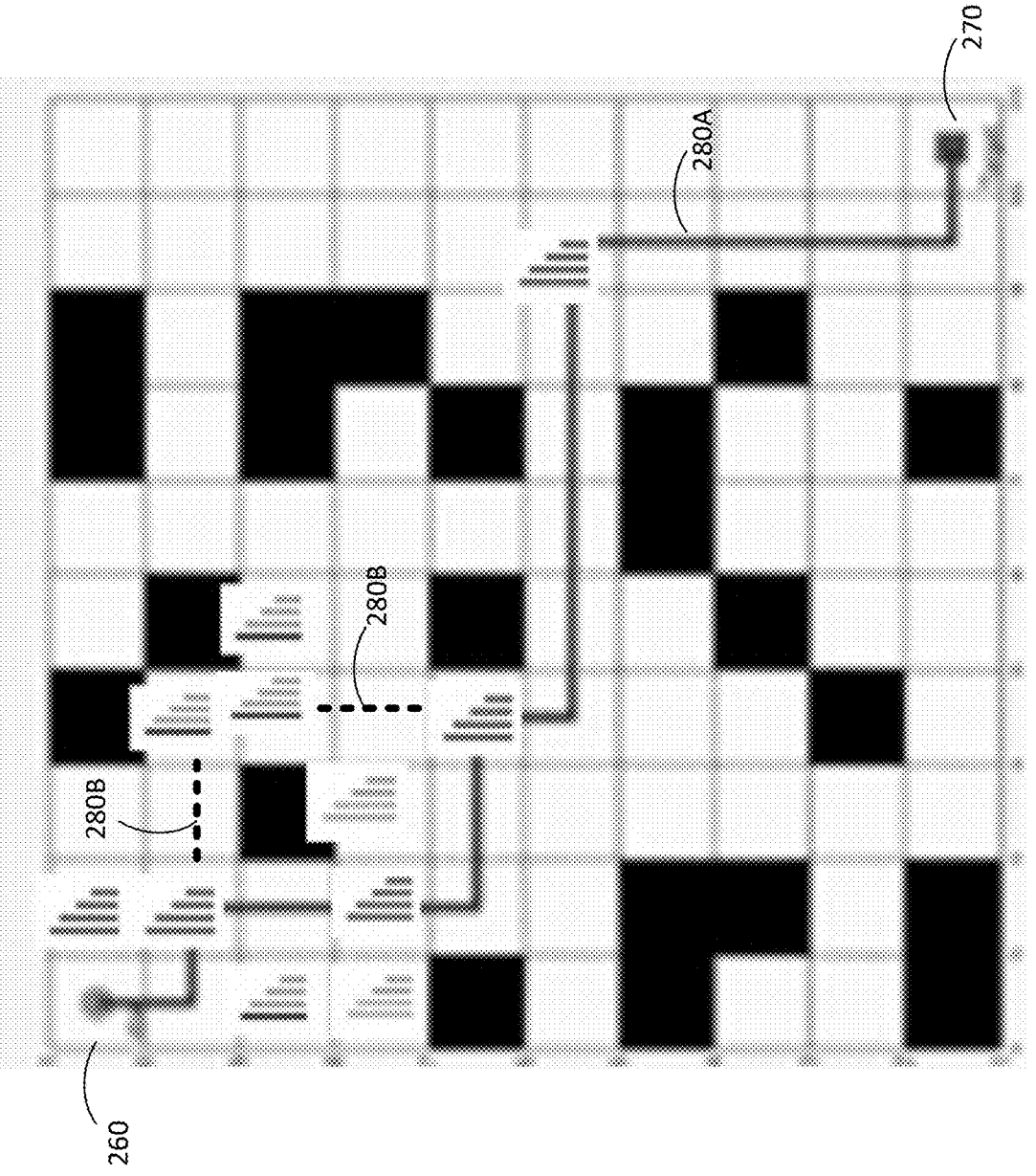
FIG. 2C illustrates a block diagram of an exemplary shared environment model incorporating wireless QoS data, in accordance with aspects of the disclosure.

An example of a planned path for one of the AMRs 102 is shown in further detail in FIG. 2C, which uses the path planning algorithm taking the QoS cost into consideration. As shown in FIG. 2C, the shared environment model 250 includes a representation of the quantized expected QoS level in various cells, which are depicted in this example as cells having varying signal strength indicators. Again, the expected QoS per cell is based upon an aggregation of various QoS metrics over time, and thus the use of these icons is for case of explanation and not by limitation, as the QoS may not rely exclusively on RSSI values as shown in FIG. 2C. As shown in FIG. 2C, various combinations of cells may be selected to identify a planned path that connects the starting point of the AMR 102 at cell 260 to a goal cell 270. Without the introduction of the QoS cost S(c) in the path planning algorithm, the AMR 102 may calculate a planned path of cells in the shared environment model 250 such as the planned path 280B as shown in FIG. 2C, which may constitute the shortest distance to the goal cell 270. However, the planned path 280B results in the AMR 102 traversing several cells having a low expected QoS score. Thus, using the QoS cost term S(c) in the path planning algorithm, the AMR 102 may calculate a planned path 280A, which may (but not necessarily) cause the AMR 102 to traverse a longer distance to reach the goal cell 270 or to take a longer time to do so, but ensures better wireless performance along that path with respect to the expected QoS scores as noted herein.

In this way, the aspects improve reliability and robustness to wireless network issues during navigation. The aspects described herein ensure that the AMR 102 will traverse a planned path between the starting cell 260 and a goal or destination cell 270 to greatly increase the likelihood that the AMR 102 will maintain communications with the central controller at all cells along the path, thereby increasing the efficiency and performance of the system in which the AMR 102 is implemented.

Offloading Path-Planning Based on Wireless QoS Using Waypoint Correction

The aspects described in this Section enable offloading of time-sensitive and compute-intensive navigation related AI-control workloads of multiple AMRs to an Edge server, for instance, using a Waypoint Correction Deep Neural Net (WC-DNN) approach. This offloading functionality advantageously enables the acceleration of navigation workloads and results in faster navigation speeds, thereby increasing productivity improvement in the environments in which the AMRs 102 are used. It is noted that the previous Section relates to the use of QoS information to perform path planning as described in FIGS. 2A-2C, for instance. Such aspects are not a requirement for the aspects discussed in the current Section, but may be particularly useful to the aspects described herein with respect to FIG. 3 to offload path planning functionality by leveraging path planning that ensures robust wireless network performance. However, the QoS path planning and the path planning offloading may be implemented independently or combined with one another, in various aspects.

As discussed above, AMRs 102 implementing conventional multi-robot navigation pipelines function to plan and control movement of multiple AMRs from one position to another in the most efficient manner while avoiding collisions with each other and obstacles in the environment 100. Depending upon the goal or destination of each AMR 102, the path planning algorithm computes a sequence or set of intermediate waypoints for each AMR 103 to reach its goal cell considering the trajectories of other AMRs and the environment map, each of which may form part of the environment model 250 that is continuously updated. The set of intermediate waypoints, which may otherwise be referred to herein simply as waypoints, are thus updated regularly using a path planner algorithm executed locally on each AMR as noted above by taking inputs from vision/LIDAR sensors mounted on the AMR so that the AMR 102 may avoid collisions while navigating the environment 100.

Traditionally, each AMR 102 determines its own state (e.g. position, heading, velocity, acceleration, bearing, orientation, pose, etc.) using on-board sensors such as multiple cameras, LIDAR, etc., which increases the required energy consumption of the compute subsystem(s). The energy consumed by compute subsystem(s) of the AMRs 102, which execute compute heavy AI functions locally, may exceed the energy consumption of the mechanical subsystem needed to control its actuators. Therefore, if these computationally heavy workloads can be offloaded from the AMR and executed on a central component (e.g. an Edge server) it would reduce energy consumption of the AMRs 102 and free up resources to enable the AMRs 102 to utilize state-of-art computationally heavy AI algorithms for fully autonomous navigation. Moreover, offloading such tasks enables the aggregation of states of all AMRs 102 at a central location (the computing device 108, which may be implemented e.g. as an Edge server). Such network infrastructure components may execute such path planning algorithms more efficiently as the central controller has access to the entire state of the environment 100.

A noted above, the path planning algorithms are generally executed locally on each AMR 102 and, given the enhancements as noted above that maps the expected QoS performance to the cells of the shared environment model 250, planned paths that use the shared environment model 250 will experience improved network performance along those paths. As a result of the increased robust nature of the planned paths with respect to wireless performance, the aspects described in further detail in this Section may leverage this advantage to offload workload tasks to a central controller. For example, because the planned paths ensure that each AMR 102 will experience good wireless network performance while travelling along their planned paths, the AMRs 102 may offload path planning functionality to one or more network infrastructure components such as the computing device 108 for example.

Figure 3:
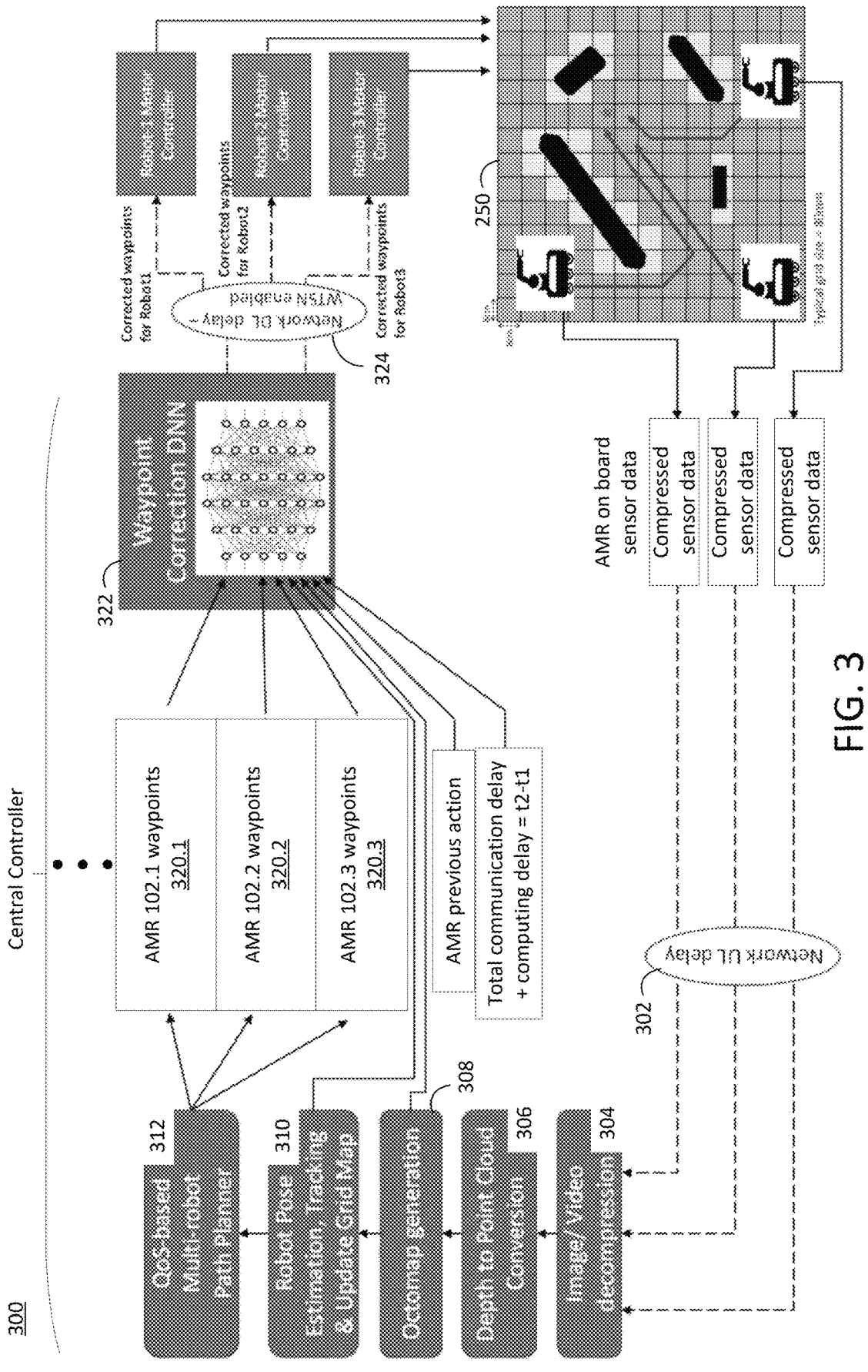
FIG. 3 illustrates a block diagram of a process flow associated with offloading navigational tasks for a multi-agent navigation pipeline and performing waypoint correction, in accordance with aspects of the disclosure.

Thus, the aspects discussed in further detail with respect to FIG. 3 make it feasible to offload time-sensitive navigation workloads to the computing device 108 via the wireless communications between the computing device 108 and the AMRs 102 within the environment 100, thereby improving navigation speed and reliability. It is noted that the navigation path planning is time-sensitive in nature. Thus, and as discussed in further detail below, the aspects enable offloading of such time-sensitive navigation related workloads (e.g. path planning, Octomap generation, SLAM, etc.) to the computing device 108 by implementing a waypoint-correction deep neural network (WC-DNN) that corrects and compensates for communication and computing latencies/delays that result from this offloading process. The WC-DNN may be implemented on the central controller and/or the AMRs 102, and predicts a current system state (e.g. location and pose of moving AMRs/obstacles) from last sampled, time-stamped state information, and accordingly adjusts the waypoints estimated by the path-planning algorithm.

FIG. 3 illustrates a process flow associated with offloading navigational tasks for a multi-robot navigation pipeline and performing waypoint correction, in accordance with aspects of the disclosure. As shown in FIG. 3, the process flow 300 illustrates the shared environment model 250 and the AMRs 102 as discussed herein with reference to FIGS. 1 and 2A-2C. Again, the AMRs 102 may communicate with the central controller via the APs 104, which may form part of a WTSN for instance. The process flow 300 is similar to the process flow 200 in that the AMRs also navigate within the environment 100 and a shared environment model 250 is implemented to calculate planned paths for the AMRs 102. Thus, only differences between the system operation of the AMRs and the network infrastructure components as shown in FIGS. 2A-2C and FIG. 3 are further discussed below.

In an aspect, the process flow 300 is initiated via the AMRs 102 transmitting sensor data to the central controller periodically or in accordance with any suitable schedule. The sensor data may include image and/or video data collected from onboard AMR cameras, which may be compressed and transmitted using any suitable format (e.g. compressed jpeg, compressed png, etc.). The AMRs 102 may additionally or alternatively transmit other types of sensor data indicative of the position and/or orientation of the AMR 102 as well as other state information such as the velocity of the AMRs 102 for example. However, because the sensor data transmission volume over the wireless network is high, the communication latency is not only high but is also non-deterministic. Therefore, each AMR 102 may time stamp the compressed sensor data prior to transmission using the synchronized WTSN time source (or other suitable synchronized time source based upon the particular wireless network that is implemented for this purpose) so that the time when the sensor data was captured may be determined for waypoint correction by the WC-DNN as discussed in further detail below. This time stamp may be referred to herein as occurring at a time 't1' for a particular sensor data transmission.

As shown in FIG. 3, the compressed sensor data is then received by the central controller (e.g. the computing device 108) after a network uplink delay or latency 302. The central controller then decompresses the sensor data at block 304 and performs various computations at processing blocks 306, 308, 310, and 312 to execute algorithms for sensor-data fusion to dynamically update the shared environment model 250 for tracking the AMRs 102, objects, and obstacles within the environment 100. Thus, the computations at blocks 306, 308, 310, and 312 may be similar or identical to the computations that are conventionally performed locally via the AMRs 102, but in accordance with the aspects described herein these computations are offloaded to the central controller in accordance with the present aspects. As an example, the central controller may utilize the decompressed image and/or video data received from the AMRs 102 to perform depth to point could conversion, perform octomap generation, determine AMR pose estimation, tracking, and update the shared environmental model 250 using this information. To the extent that these processes were discussed herein with respect to FIG. 2A, these may be considered similar or identical to the computations performed here, and thus additional detail is not provided for the sake of brevity. Moreover, further detail is not provided with respect to these computations, which may be implemented in accordance with any suitable techniques, including known techniques, to do so.

Once the shared environmental model 250 is updated in this manner, which includes the expected per cell QoS as noted above, the central controller performs the navigation path planning as noted above for each of the AMRs 102 within the environment 100 from which the sensor data is received. To do so, the central controller calculates a set of waypoints from the starting position of each AMR 102 as noted in the Section above, which may be optimized to consider wireless network performance using the QoS metrics. This series of intermediate waypoints indicates cells or locations within the environment 100 that the AMRs 102 should traverse at specific times. In an aspect, the waypoints for each AMR are updated regularly in real time using the states of other AMRs 102 and the dynamically updated shared environment model 250 that indicates the nature of the environment 100. The planned paths include sets of waypoints that define an AMR trajectory within the environment 100 between the AMR's starting point and a destination or goal cell. A mathematical representation of example waypoints calculated in this manner for each AMRs 102.1, 102.2, 102.3 is provided below.

AMR 102.1 waypoints:

$$w_1(t_0)=(x_0,y_0,\theta_0)$$

$$w_1(t_1=t_0+dt)=(x_1,y_1,\theta_1)\ldots$$

$$w_1(t_n=t_{n-1}+dt)=(x_n,y_n,\theta_n)$$

AMR 102.2 waypoints:

$$w_2(t_0)=(x_0,y_0,\theta_0)$$

$$w_2(t_1=t_0+dt)=(x_1,y_1,\theta_1)\ldots$$

$$w_2(t_n=t_{n-1}+dt)=(x_n,y_n,\theta_n)$$

AMR 102.3 waypoints:

$$w_3(t_0)=(x_0,y_0,\theta_0)$$

$$w_3(t_1=t_0+dt)=(x_1,y_1,\theta_1)\ldots$$

$$w_3(t_n=t_{n-1}+dt)=(x_n,y_n,\theta_n)$$

In other words, the initial waypoint for the location $x_0$, $y_0$ and orientation 0% of the AMR 102.1 at a time to corresponds to the initial starting point of the AMR. Each additional intermediate waypoint corresponds to the location and orientation of the AMR 102.1 at an incremental time period dt after the starting time. Thus, each sequential waypoint corresponds to a position and orientation of the AMR 102.1 (e.g. a cell and orientation of the AMR within that cell) at specific times, up until the location and orientation of the AMR 102.1 at a time ty, which corresponds to an ending waypoint and is associated with a time when the AMR 102.1 should be at the destination or goal cell. The central controller may perform path planning in this manner for each of the AMRs 102 operating within the environment 100 to generate a set of such waypoints as represented above in a mathematical format. For purposes of further discussion below, the time at which a set of waypoints is calculated by the central controller in this manner may occur at a time after the sensor data is received, decompressed, and processed as shown in FIG. 3, which is referred to herein as time 't₂'. The time $t_2$ may be identified with another time stamp in accordance with the synchronized WTSN time source (or other suitable synchronized time source based upon the particular wireless network that is implemented for this purpose).

Again, the waypoints are conventionally calculated locally by each AMR 102 (but conventionally without consideration of QoS information as noted herein), and the waypoints thus function as instructions for each AMR regarding how to proceed through a chain of connected cells at specific times until a destination or goal cell is reached. But because of the dynamic nature of the environment 100, the parameters of the waypoints (e.g. the location and times of the AMR to follow along a planned path) may also be updated dynamically as the environment 100 changes. Such changes may be the result of detecting the proximity or state of of other AMRs 102 and/or changes to the shared environment model 250. Because of this dynamic nature of the environment 100 and the time-sensitive nature of the waypoint calculations, conventionally such navigation functions cannot be offloaded by the AMRs 102 and must be calculated locally.

In other words, the process of offloading these tasks introduces both communication and computational latencies, which cause inaccurate waypoint calculations with an accumulating error over time, leading to inaccurate navigation and control of the AMRs 102. For example, a total system delay may be represented as TD=t2−t1, and includes the uplink communication latency (or delay) to send the sensor data to the central controller in addition to the computational latency (or delay) to process the sensor data to extract the waypoints. Again, t1 represents the time at the instant of sensor sampling on the AMR 102 and t2 represents the time after the waypoints are computed by the central controller. Therefore, due to the delay TD, the waypoints are computed by the central controller using a path planning algorithm based on delayed state information, and are not current with respect to the real-time information of the AMRs 102 within the environment 100. Again, this error may accumulate and lead to the AMRs 102 deviating from their paths or colliding due to inaccurate velocity estimates.

To remedy this issue, the aspects described herein implement a WC-DNN 322, which may be implemented in the AMR 102 and/or in the central controller, in various aspects. However, implementing the WC-DNN 302 at the central controller may be particularly advantageous to further simplify the overall design and reduce the cost of the AMRs 102, which can as a result be designed with less processing capabilities. In any event, aspects include the WC-DNN being implemented as any suitable type of neural network that receives various inputs to predict a total system delay and thus calculate delay-corrected waypoints for each of the AMRs 102.

For instance, the WC-DNN may receive as inputs the "initial" waypoints calculated for one or more of the AMRs 102 as noted above, which are calculated via the path planning algorithms without consideration to the system (e.g. communication and computational) latencies. In other words, the WC-DNN 322 receives as inputs waypoints estimated for all AMRs using the delayed state information. Additionally, the WC-DNN may receive as inputs the outputs of intermediate navigation processing blocks such as the waypoints calculated for each of the AMRs 102 by the path planner processing block 312, the pose (e.g. position and orientation) of the AMRs 102 in the updated grid map that is processed at the processing block 310, and the information about which grids in the grid map are occupied by an obstacle and which grid is free for AMRs 102 to navigate, which is generated via the Octomap processing block 308 as noted above and shown in FIG. 3. Furthermore, aspects include the WC-DNN 322 receiving as inputs the previous actions taken by the AMRs 102 and the total system delay TD that is estimated from the WTSN time stamps (t2–t1). The WC-DNN 322 then outputs delay-corrected waypoints that are transmitted to the AMRs 102 as commands and/or instructions to cause the AMRs to follow the planned path in accordance with the delay-corrected waypoints.

In an aspect, the WC-DNN 322 may be implemented as any suitable type of machine learning model and/or neural network. As an example, the WC-DNN 322 may be trained offline in a simulation environment by feeding the WC-DNN 322 simulated delays in a realistic range using a wireless network simulator in accordance with the particular wireless network that is used for the application. For example, if the APs 104 implement Wi-Fi communication standards, then a Mininet simulator may be used. Alternatively, if the APs 104 implement a cellular-based technology (e.g. a 3rd Generation Partnership Project (3GPP) cellular technology such as the most recent "5G" technology at the time of this writing), then other simulators such as Omnet++ may be used. In any event, the WC-DNN 322 may be trained using any suitable type of simulator that simulates realistic network conditions for a simulated environment 100.

In an aspect, the WC-DNN 322 may be implemented as a long short-term memory (LSTM) based network, although this is by way of example and the WC-DNN 322 may be implemented as any suitable type of machine learning model and/or neural network architecture, which may or may not require training to function in accordance with the aspects described herein. In an aspect, the WC-DNN 322 may thus use the communication and computational delays introduced in performing updates to the shared environment model 250 (e.g. via the processing at block 310) and the current velocity of the AMRs 102 to predict the delay in the trajectory of each of the AMRs 102. Using this information, the WC-DNN 322 may thus calculate delay-corrected waypoints from the predicted delay that functions to fine tune the velocity of each of the AMRs 102 so that the AMRs 102 have a corrected planned path that is synchronized with their actual or "real-time" trajectories (e.g. their trajectory at the time when the waypoints are actually executed by each AMR). In other words, the WC-DNN 322 calculates the delay-corrected waypoints using the predicted delay to compensate for the trajectory delay as a result of the system latencies described herein, such that the delay-corrected waypoints are synchronized with a trajectory of the AMRs 102 within the environment 100 at the moment when each AMR 102 actually executes waypoints.

Furthermore, because the output of WC-DNN 322 is waypoints for the AMRs 102, this data typically constitutes only a few hundred bytes of information. Therefore, the corrected waypoint information may be transmitted to the AMRs 102 as low-latency and deterministic control packets (e.g. using the WTSN protocol), after predictable additional delay adjustments have been made. In other words, unlike the UL latency, the DL latency is deterministic and may be determined or predicted using any suitable techniques, including known techniques to do so. Once identified, the WC-DNN 322 may further adjust the delay-corrected waypoints to account for the time in which the AMRs 102 will receive the transmission via the DL path (i.e. DL latency). Finally, upon receiving the corrected waypoint data, the AMRs 102 will execute the waypoint information to move in a manner as per the delay-corrected waypoints to reach their intermediate destinations at each time instant. Thus, waypoint correction aspects enable offloading of compute-heavy navigation-related workloads from the AMRs 102 to a central controller without being significantly impacted by the communication and computing latency.

AMR Design and Configuration

Figure 4:
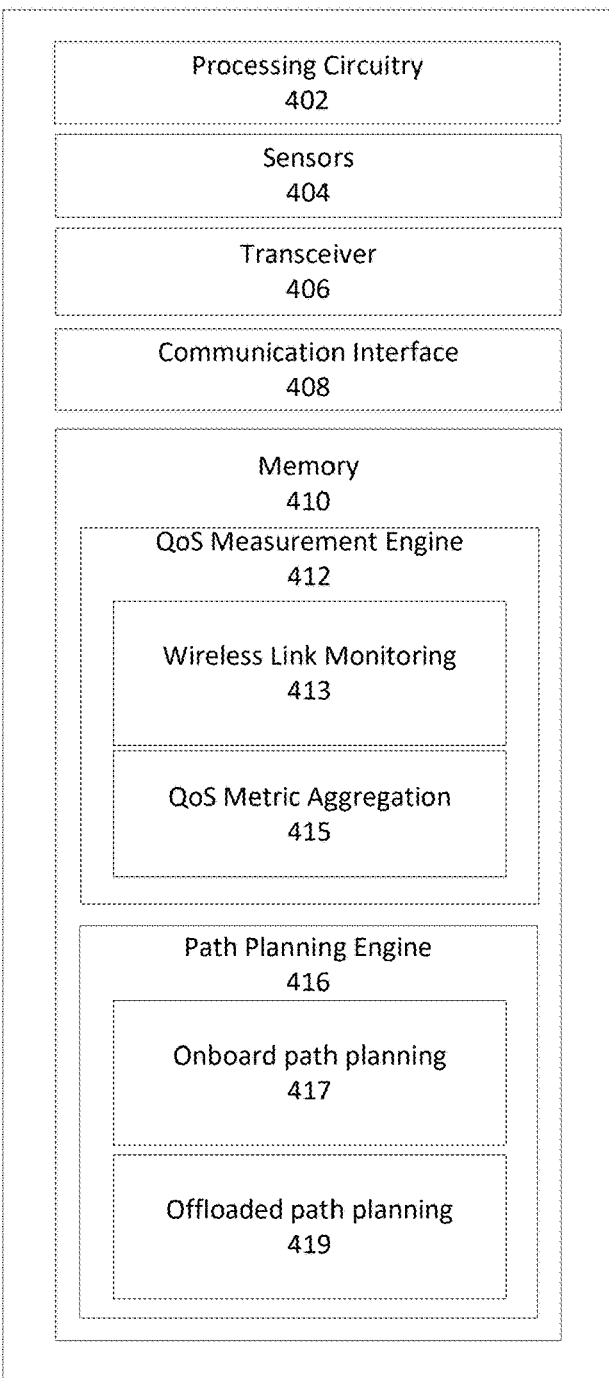
FIG. 4 illustrates a block diagram of an exemplary autonomous agent, in accordance with an aspects of the disclosure.

FIG. 4 illustrates a block diagram of an exemplary autonomous agent, in accordance with an aspects of the disclosure. In an aspect, the autonomous agent 400 as shown and described with respect to FIG. 4 may be identified with one or more of the AMRs 102 as shown in FIG. 1 and discussed herein, for instance. As further discussed below, the autonomous agent 400 may operate in the environment 100 in accordance with the aspects as discussed herein with respect to, for instance, FIGS. 2A-2C and 3. Thus, the autonomous agent 400 may perform the various functionality as described herein with respect to performing wireless link monitoring, transmitting measured QoS metrics to a computing device such as an Edge computing device, performing path planning calculations, offloading path planning to other network infrastructure components and executing planned paths received from network infrastructure components, preforming various tasks within the environment 100, etc. To do so, the autonomous agent 400 may include processing circuitry 402, sensors 404, a transceiver 406, communication interface 408, and a memory 410. The components shown in FIG. 4 are provided for case of explanation, and aspects include the autonomous agent 400 implementing additional, less, or alternative components as those shown in FIG. 4.

In various aspects, the processing circuitry 402 may be configured as any suitable number and/or type of computer processors, which may function to control the autonomous agent 400 and/or other components of the autonomous agent 400. The processing circuitry 402 may be identified with one or more processors (or suitable portions thereof) implemented by the autonomous agent 400. For example, the processing circuitry 402 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, aspects include the processing circuitry 402 being configured to carry out instructions to perform arithmetical, logical, and/or input/output (I/O) operations, and/or to control the operation of one or more components of autonomous agent 400 to perform various functions associated with the aspects as described herein. For example, the processing circuitry 402 may include one or more microprocessor cores, memory registers, buffers, clocks, etc., and may generate electronic control signals associated with the components of the autonomous agent 400 to control and/or modify the operation of these components. For example, aspects include the processing circuitry 402 communicating with and/or controlling functions associated with the sensors 404, the transceiver 406, the communication interface 408, and/or the memory 410. The processing circuitry 402 may additionally perform various operations to control the movement, speed, and/or tasks executed by the autonomous agent 400, in various aspects, which may be based upon local path planning or offloaded path planning algorithms, as discussed herein.

In an aspect, the sensors 404 may be implemented as any suitable number and/or type of sensors that may be used for autonomous navigation and environmental monitoring. Examples of such sensors may include radar, LIDAR, optical sensors, cameras, compasses, gyroscopes, positioning systems for localization, accelerometers, etc.

In an aspect, the transceiver 406 may be implemented as any suitable number and/or type of components configured to transmit and/or receive data packets and/or wireless signals in accordance with any suitable number and/or type of communication protocols. The transceiver 406 may include any suitable type of components to facilitate this functionality, including components associated with known transceiver, transmitter, and/or receiver operation, configurations, and implementations. Although depicted in FIG. 4 as a transceiver, the transceiver 406 may include any suitable number of transmitters, receivers, or combinations of these that may be integrated into a single transceiver or as multiple transceivers or transceiver modules. For example, the transceiver 406 may include components typically identified with an RF front end and include, for example, antennas, ports, power amplifiers (PAs), RF filters, mixers, local oscillators (LOs), low noise amplifiers (LNAs), upconverters, downconverters, channel tuners, etc.

Regardless of the particular implementation, the transceiver 406 may include one or more components configured to listen for and/or measure various QoS metrics with respect to one or more wireless links as discussed herein.

In an aspect, the communication interface 408 may be configured as any suitable number and/or type of components configured to facilitate the transceiver 406 receiving and/or transmitting data and/or signals in accordance with one or more communication protocols, as discussed herein. For example, the communication interface 408 may be implemented as any suitable number and/or type of components that function to interface with the transceiver 406, such as analog-to-digital converters (ADCs), digital to analog converters, intermediate frequency (IF) amplifiers and/or filters, modulators, demodulators, baseband processors, etc. The communication interface 408 may thus work in conjunction with the transceiver 406 and form part of an overall communication circuitry implemented by the autonomous agent 400.

In an aspect, the memory 410 stores data and/or instructions such that, when the instructions are executed by the processing circuitry 402, cause the autonomous agent 400 to perform various functions as described herein, such as those described herein with reference to FIGS. 2A-2C and 3, for example. The memory 410 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 410 may be non-removable, removable, or a combination of both. For example, the memory 410 may be implemented as a non-transitory computer readable medium storing one or more executable instructions such as, for example, logic, algorithms, code, etc.

As further discussed below, the instructions, logic, code, etc., stored in the memory 410 are represented by the various modules as shown in FIG. 4, which may enable the aspects disclosed herein to be functionally realized. Alternatively, if the aspects described herein are implemented via hardware, the modules shown in FIG. 4 associated with the memory 410 may include instructions and/or code to facilitate control and/or monitor the operation of such hardware components. In other words, the modules shown in FIG. 4 are provided for ease of explanation regarding the functional association between hardware and software components. Thus, aspects include the processing circuitry 402 executing the instructions stored in these respective modules in conjunction with one or more hardware components to perform the various functions associated with the aspects as further discussed herein.

The QoS measurement engine 412 may represent the functionality described herein as discussed with reference to the various aspects, such as the link monitoring and L1-L7 statistics aggregation as shown in FIG. 2A, for example. To do so, aspects include the QoS measurement engine 412 comprising a wireless link monitoring module 413 and s a QoS metric aggregation module 415.

In an aspect, the executable instructions stored in the wireless link monitoring module 413 may facilitate, in conjunction with execution via the processing circuitry 402, the autonomous agent 400 performing wireless link monitoring of the various wireless links used by the autonomous agent 400 for communications with a central controller or other network infrastructure components as discussed herein. This may include, for instance, monitoring communications via the transceiver 406 and/or the communication interface 408 to identify the various QoS metrics on a per cell (location) and per time basis. For example, this may include the same functionality as discussed herein in FIG. 2A with reference to the processing block 210.

In an aspect, the executable instructions stored in the QoS metric aggregation module 415 may facilitate, in conjunction with execution via the processing circuitry 402, the determination of specific L1-L7 QoS metrics that are to be transmitted to a central controller or other suitable network infrastructure component as discussed herein. This may include, for example, identifying whether appropriate time-based or location-based triggers have been satisfied that results in the transmission of the various QoS metrics. As another example, this may include "packaging" the aggregated L1-L7 QoS metrics as part of a data transmission using a suitable communication protocol, which may represent predetermined sets of QoS metrics and/or QoS metrics that are acquired for any suitable number of grid cells and/or specific times. For example, this may include the same functionality as discussed herein in FIG. 2A with reference to the processing block 212.

The path planning engine 416 may represent the functionality described herein as discussed with reference to the various aspects, such as the autonomous agent 400 calculating a navigational path and/or offloading this functionality to a central controller or other suitable network infrastructure component, as discussed herein with respect to FIGS. 2A-2C and 3 for example. To do so, aspects include the path planning engine 416 comprising an onboard path planning module 417 and an offloaded path planning module 419.

In an aspect, the executable instructions stored in the onboard path planning module 417 may facilitate, in conjunction with execution via the processing circuitry 402, the autonomous agent 400 calculating a navigational path using the shared environment model 250, as discussed herein with reference to FIGS. 2A-2C for example. In some aspects, the onboard path planning module 417 may implement a WC-DNN as discussed herein to predict system latencies and/or to iteratively calculate a planned path of cells within the shared environment model 250. Again, this may include the autonomous agent identifying an optimum path using the cost functions as noted above by further implementing the per cell mapped QoS scores that have been incorporated into the shared environment model 250. For example, this may include the same functionality as discussed herein in FIG. 2A with reference to the processing blocks 202, 204, 206, and 208.

In an aspect, the executable instructions stored in the offloaded path planning module 419 may facilitate, in conjunction with execution via the processing circuitry 402, the offloading of the local path planning algorithms to the central controller or other suitable network infrastructure component, as discussed herein with respect to FIG. 3 for example. To do so, the offloaded path planning module 419 may facilitate the autonomous agent 400 transmitting sensor data (e.g. compressed image and/or video data) to the central controller together with an acquired synchronized time stamp that are to be transmitted to a central controller or other suitable network infrastructure component as discussed herein. As another example, this may include the offloaded path planning module 419 facilitating the autonomous agent 400 receiving delay-corrected waypoints identified with a calculated navigational path, which are then executed by the autonomous agent 400 to follow a specific trajectory (e.g. a chain of adjacent cells) to a destination or goal cell using the shared environment model 250. The onboard path planning module 417 and the offloaded path planning module 419 may be considered as alternate components with one or the other being implemented depending upon the particular application, in some aspects. However, in other aspects both the onboard path planning module 417 and the offloaded path planning module 419 may be implemented which may be particularly useful, for instance, to selectively enable both types of path planning in a dynamic manner or selecting a specific type of path planning technique based upon the particular application.

Central Controller Design and Configuration

Figure 5:
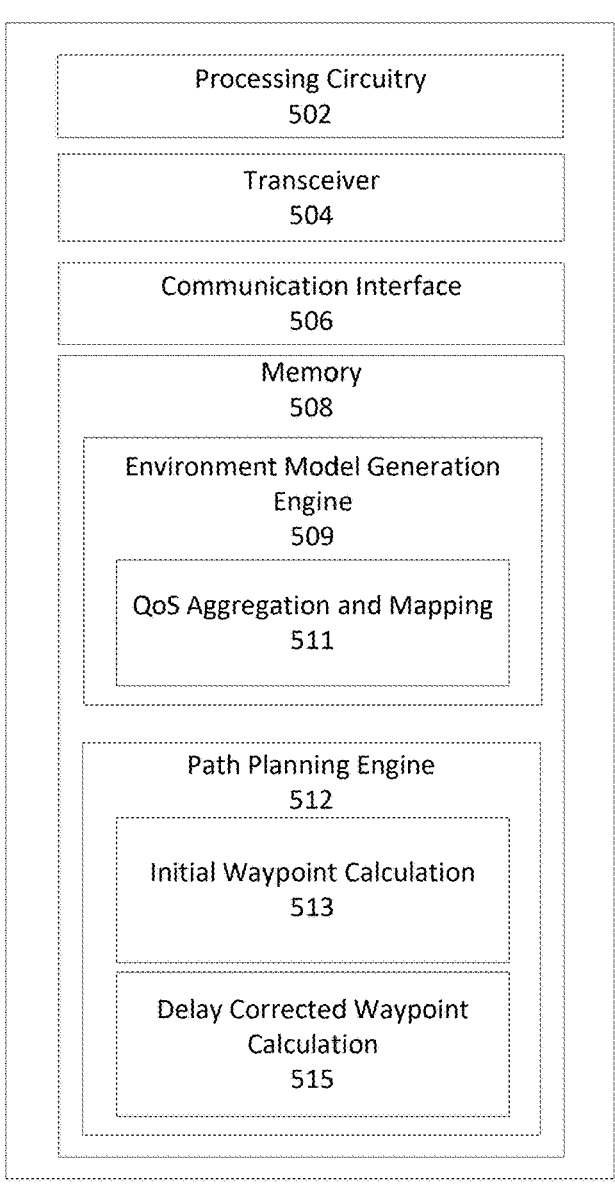
FIG. 5 illustrates a block diagram of an exemplary computing device, in accordance with an aspects of the disclosure.

FIG. 5 illustrates a block diagram of an exemplary computing device, in accordance with an aspects of the disclosure. In an aspect, the computing device 500 as shown and described with respect to FIG. 5 may be identified with a central controller and be implemented as any suitable network infrastructure component, such as the computing device 108 as shown in FIG. 1 and discussed herein, for instance, which may be implemented as an Edge network server, computing device, etc. As further discussed below, the computing device 500 may serve the environment 100 in accordance with the aspects as discussed herein with respect to, for instance, FIGS. 2A-2C and 3. Thus, the computing device 500 may perform the various functionality as described herein with respect to receiving and aggregating QoS metrics and calculating QoS scores for each cell of the shared environment model 250, generating and updating the shared environment model using these QoS metrics as received over time, calculating initial and delay-corrected waypoints for a planned navigation path for the AMRs 102, and transmitting the delay-corrected waypoints and/or other suitable commands to the AMRs 102. To do so, the computing device 500 may include processing circuitry 502, a transceiver 504, communication interface 506, and a memory 508. The components shown in FIG. 5 are provided for case of explanation, and aspects include the computing device 500 implementing additional, less, or alternative components as those shown in FIG. 5.

In various aspects, the processing circuitry 502 may be configured as any suitable number and/or type of computer processors, which may function to control the computing device 500 and/or other components of the computing device 500. The processing circuitry 502 may be identified with one or more processors (or suitable portions thereof) implemented by the computing device 500. For example, the processing circuitry 502 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, aspects include the processing circuitry 502 being configured to carry out instructions to perform arithmetical, logical, and/or input/output (I/O) operations, and/or to control the operation of one or more components of computing device 500 to perform various functions associated with the aspects as described herein. For example, the processing circuitry 502 may include one or more microprocessor cores, memory registers, buffers, clocks, etc., and may generate electronic control signals associated with the components of the computing device 500 to control and/or modify the operation of these components. For example, aspects include the processing circuitry 502 communicating with and/or controlling functions associated with the transceiver 504, the communication interface 506, and/or the memory 508. The processing circuitry 502 may additionally perform various operations to control the communications, communications scheduling, and/or operation of other network infrastructure components that are communicatively coupled to the computing device 500.

In an aspect, the transceiver 504 may be implemented as any suitable number and/or type of components configured to transmit and/or receive data packets and/or wireless signals in accordance with any suitable number and/or type of communication protocols. The transceiver 504 may include any suitable type of components to facilitate this functionality, including components associated with known transceiver, transmitter, and/or receiver operation, configurations, and implementations. Although depicted in FIG. 5 as a transceiver, the transceiver 504 may include any suitable number of transmitters, receivers, or combinations of these that may be integrated into a single transceiver or as multiple transceivers or transceiver modules. For example, the transceiver 504 may include components typically identified with an RF front end and include, for example, antennas, ports, power amplifiers (PAs), RF filters, mixers, local oscillators (LOs), low noise amplifiers (LNAs), upconverters, downconverters, channel tuners, etc.

In an aspect, the communication interface 506 may be configured as any suitable number and/or type of components configured to facilitate the transceiver 504 receiving and/or transmitting data and/or signals in accordance with one or more communication protocols, as discussed herein. For example, the communication interface 506 may be implemented as any suitable number and/or type of components that function to interface with the transceiver 506, such as analog-to-digital converters (ADCs), digital to analog converters, intermediate frequency (IF) amplifiers and/or filters, modulators, demodulators, baseband processors, etc. The communication interface 506 may thus work in conjunction with the transceiver 504 and form part of an overall communication circuitry implemented by the computing device 500.

In an aspect, the memory 508 stores data and/or instructions such that, when the instructions are executed by the processing circuitry 502, cause the computing device 500 to perform various functions as described herein, such as those described herein with reference to FIGS. 2A-2C and 3, for example. The memory 508 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 508 may be non-removable, removable, or a combination of both. For example, the memory 508 may be implemented as a non-transitory computer readable medium storing one or more executable instructions such as, for example, logic, algorithms, code, etc.

As further discussed below, the instructions, logic, code, etc., stored in the memory 508 are represented by the various modules as shown in FIG. 5, which may enable the aspects disclosed herein to be functionally realized. Alternatively, if the aspects described herein are implemented via hardware, the modules shown in FIG. 5 associated with the memory 508 may include instructions and/or code to facilitate control and/or monitor the operation of such hardware components. In other words, the modules shown in FIG. 5 are provided for case of explanation regarding the functional association between hardware and software components. Thus, aspects include the processing circuitry 502 executing the instructions stored in these respective modules in conjunction with one or more hardware components to perform the various functions associated with the aspects as further discussed herein.

The environment model generation engine 509 may represent the functionality described herein as discussed with reference to the various aspects, such as the QoS metric aggregation, QoS score calculation, and mapping of the QoS scorers to cells of the shared environment model 250, for instance as shown in FIG. 2A. To do so, aspects include environment model generation engine 509 comprising a QoS aggregation and mapping module 511. For example, this may include the same functionality as discussed herein in FIG. 2A with reference to the processing block 214 of the computing device 108. In an aspect, the executable instructions stored in the QoS aggregation and mapping module 511 may facilitate, in conjunction with execution via the processing circuitry 502, the computing device 500 receiving the QoS metrics from one or more the AMRs 102 and aggregating the QoS metrics to calculate a per cell QoS score as discussed herein. This may also include, for instance, using the per cell calculated QoS scores to generate and update the shared environment model 250 as additional QoS metrics are received over time.

The path planning engine 512 may represent the functionality described herein as discussed with reference to the various aspects, such as the computing device 500 calculating a navigational path, as discussed herein with respect to FIG. 3 for example. To do so, aspects include the path planning engine 512 comprising an initial waypoint calculation module 513 and a delay-corrected waypoint correction module 515.

In an aspect, the executable instructions stored in the initial waypoint calculation module 513 may facilitate, in conjunction with execution via the processing circuitry 502, the computing device 500 calculating a navigational path including a series of waypoints for each of the AMRs 102 operating within the environment 100. As shown and discussed herein with reference to FIG. 3, this may include the computing device 500 receiving time stamped sensor data (e.g. images and/or video) from the AMRs 102, which is then decompressed to perform depth to point cloud conversion, octomap generation, and pose estimation, tracking and updating to their grid map (e.g. the shared environment model 250), and then calculating QoS based paths that yield a set of waypoints that are dynamically updated over time. For example, this may include the same functionality as discussed herein in FIG. 3 with reference to the processing blocks 304, 306, 308, 310, and 312 of the central controller. Again, the calculation of the paths that incorporate the QoS scores may be performed in a similar manner to the path planning algorithms executed locally by the AMRs 102, which may be offloaded in this manner in accordance with various aspects.

In an aspect, the executable instructions stored in the delay-corrected waypoint correction module 515 may facilitate, in conjunction with execution via the processing circuitry 502, the calculation of the delay-corrected waypoints that are then transmitted to the AMRs 102. To do so, the delay-corrected waypoint correction module 515 may implement the a waypoint correction neural network (e.g. the WC-DNN 322) that is trained and receives the initial waypoints 320 as well as additional data such as the AMR previous action and data with respect to the overall system delay or latency as discussed above with respect to FIG. 3. Aspects include the computing device further accounting for other latencies (e.g. DL path latencies) to further adjust the delay-corrected waypoints, which are then transmitted to the AMRs 102.

EXAMPLES

The following examples pertain to further aspects.

An example (e.g. example 1) relates to a computing device that includes communication circuitry configured to receive quality of service (QoS) metrics from an autonomous agent operating within an environment of a wireless network in which the autonomous agent communicates with the computing device via one or more wireless links, the QoS metrics corresponding to the one or more wireless links and are generated by the autonomous agent via monitoring of the one or more wireless links; and one or more processors configured to generate an environment model using the QoS metrics, the environment model representing a model of the environment for navigation path planning of the autonomous agent within the environment.

Another example (e.g. example 2) relates to a previously-described example (e.g. example 1) in which the computing device is an Edge network computing device.

Another example (e.g. example 3) relates to a previously-described example (e.g. one or more of the examples 1-2), in which the autonomous agent is from among a plurality of autonomous agents operating within the environment, the environment model comprises a set of grid cells, and the one or more processors are configured to aggregate the QoS metrics received from each of the plurality of autonomous agents to calculate an expected QoS score per grid cell that represents the expected QoS level in a respective grid cell.

Another example (e.g. example 4) relates to a previously-described example (e.g. one or more of the examples 1-3), in which the one or more processors are configured to calculate the expected QoS per grid cell score using a weighted averaging function, with more recent values being assigned a higher weight.

Another example (e.g. example 5) relates to a previously-described example (e.g. one or more of the examples 1-4), in which the navigation path comprises a chain of connected grid cells from among the plurality of grid cells that indicate a path within the environment for the autonomous agent to traverse to reach a destination grid cell.

Another example (e.g. example 6) relates to a previously-described example (e.g. one or more of the examples 1-5), in which the one or more processors are configured to calculate the environment model that incorporates the expected QoS score per grid cell.

Another example (e.g. example 7) relates to a previously-described example (e.g. one or more of the examples 1-6), in which the QoS metrics include at least one of: latency, receive signal strength indicator (RSSI) values, packet error rate (PER), jitter, bit error rate (BER), signal to noise ratio (SNR), signal to noise plus interference ratio (SINR), carrier to interference plus noise ratio (CINR), or modulation and coding schemes (MCS) histogram data.

An example (e.g. example 8) relates to an autonomous agent that includes communication circuitry configured to enable the autonomous agent to communicate with a computing device via a wireless network using one or more wireless links within an environment; and one or more processors configured to monitor the one or more wireless links and to generate quality of service (QoS) metrics with respect to the one or more wireless links from the monitoring, the communication circuitry being further configured to transmit the QoS metrics to the computing device for the generation of an environment model associated with the environment, and the one or more processors being configured to calculate a navigation path for the autonomous agent in accordance with the environment model for the autonomous agent to navigate to a destination within the environment.

Another example (e.g. example 9) relates to a previously-described example (e.g. example 8), in which the communication circuitry is configured to communicate with an Edge network computing device that comprises the computing device.

Another example (e.g. example 10) relates to a previously-described example (e.g. one or more of the examples 8-9), in which the autonomous agent is from among a plurality of autonomous agents operating within the environment, the environment model comprises a set of grid cells, and the environment model incorporates an expected QoS score per grid cell from an aggregation of QoS metrics transmitted by each of the plurality of autonomous agents.

Another example (e.g. example 11) relates to a previously-described example (e.g. one or more of the examples 8-10), in which the expected QoS per grid cell score is based upon a weighted averaging function, with more recent values being assigned a higher weight.

Another example (e.g. example 12) relates to a previously-described example (e.g. one or more of the examples 8-11), in which the navigation path comprises a chain of connected grid cells from among the plurality of grid cells that indicate a path within the environment for the autonomous agent to traverse to reach a destination grid cell.

Another example (e.g. example 13) relates to a previously-described example (e.g. one or more of the examples 8-12), in which the one or more processors are configured to calculate the navigation path by iteratively executing a cost function that uses the expected QoS score per grid cell and an estimate of a possible QoS score from a grid cell in the navigation path to reach a destination grid cell.

Another example (e.g. example 14) relates to a previously-described example (e.g. one or more of the examples 8-13), in which the QoS metrics include at least one of: latency, receive signal strength indicator (RSSI) values, packet error rate (PER), jitter, bit error rate (BER), signal to noise ratio (SNR), signal to noise plus interference ratio (SINR), carrier to interference plus noise ratio (CINR), or modulation and coding schemes (MCS) histogram data.

An example (e.g. example 15) relates to a computing device that includes communication circuitry configured to receive, via a wireless network, sensor data from an autonomous agent operating within an environment after the sensor data is transmitted by the autonomous agent in accordance with a communication delay; one or more processors configured to calculate a navigation path for the autonomous agent to reach a destination within the environment using the sensor data, the navigation path comprising a plurality of waypoints, the calculation being associated with a computing delay; and a waypoint correction neural network configured to (i) receive the plurality of waypoints, (ii) predict a trajectory delay of the autonomous agent caused by the communication delay and the computing delay, and (iii) calculate a plurality of delay-corrected waypoints, the communication circuitry being further configured to transmit the plurality of delay-corrected waypoints to the autonomous agent for the autonomous agent to traverse the navigation path.

Another example (e.g. example 16) relates to a previously-described example (e.g. example 15), in which the computing device is an Edge network computing device.

Another example (e.g. example 17) relates to a previously-described example (e.g. one or more of the examples 15-16), in which the waypoint correction neural network comprises a deep neural network implementing a long short-term memory (LSTM) architecture.

Another example (e.g. example 18) relates to a previously-described example (e.g. one or more of the examples 15-17), in which the waypoint correction neural network is configured to calculate the plurality of delay-corrected waypoints further using a predicted delay associated with downlink communication latency with respect to a time required to transmit the plurality of delay-corrected waypoints to the autonomous agent.

Another example (e.g. example 19) relates to a previously-described example (e.g. one or more of the examples 15-18), in which the autonomous agent is from among a plurality of autonomous agents operating within the environment, and the one or more processors are configured to calculate the navigation path for the autonomous agent using an environment model comprising a set of grid cells having an expected QoS score per grid cell that is calculated using an aggregation of a respective set of QoS metrics received from each one of the plurality of autonomous agents, the QoS metrics corresponding to one or more wireless links used for communications between the computing device and the plurality of autonomous agents.

Another example (e.g. example 20) relates to a previously-described example (e.g. one or more of the examples 15-19), in which the QoS metrics include at least one of: latency, receive signal strength indicator (RSSI) values, packet error rate (PER), jitter, bit error rate (BER), signal to noise ratio (SNR), signal to noise plus interference ratio (SINR), carrier to interference plus noise ratio (CINR), or modulation and coding schemes (MCS) histogram data.

Another example (e.g. example 21) relates to a previously-described example (e.g. one or more of the examples 15-20), in which the plurality of waypoints form the navigation path between a starting location of the autonomous agent and the destination, each one of the plurality of waypoints represents a location within the environment that the autonomous agent is to traverse at a respective traversal time, and the time required to perform the calculation of the plurality of waypoints is associated with the computing delay.

Another example (e.g. example 22) relates to a previously-described example (e.g. one or more of the examples 15-21), in which the waypoint correction neural network is configured to calculate the plurality of delay-corrected waypoints to compensate for the trajectory delay such that the plurality of delay-corrected waypoints are synchronized with a trajectory of the autonomous agent within the environment when the autonomous agent executes the plurality of waypoints.

An example (e.g. example 23) relates to a computing means that includes a communication means for receiving quality of service (QoS) metrics from an autonomous agent operating within an environment of a wireless network in which the autonomous agent communicates with the computing device via one or more wireless links, the QoS metrics corresponding to the one or more wireless links and are generated by the autonomous agent via monitoring of the one or more wireless links; and a processing means for generating an environment model using the QoS metrics, the environment model representing a model of the environment for navigation path planning of the autonomous agent within the environment.

Another example (e.g. example 24) relates to a previously-described example (e.g. example 23) in which the computing means is an Edge network computing device.

Another example (e.g. example 25) relates to a previously-described example (e.g. one or more of the examples 23-24), in which the autonomous agent is from among a plurality of autonomous agents operating within the environment, the environment model comprises a set of grid cells, and the processing means aggregating the QoS metrics received from each of the plurality of autonomous agents to calculate an expected QoS score per grid cell that represents the expected QoS level in a respective grid cell.

Another example (e.g. example 26) relates to a previously-described example (e.g. one or more of the examples 23-25, in which the processing means calculate the expected QoS per grid cell score using a weighted averaging function, with more recent values being assigned a higher weight.

Another example (e.g. example 27) relates to a previously-described example (e.g. one or more of the examples 23-26), in which the navigation path comprises a chain of connected grid cells from among the plurality of grid cells that indicate a path within the environment for the autonomous agent to traverse to reach a destination grid cell.

Another example (e.g. example 28) relates to a previously-described example (e.g. one or more of the examples 23-27), in which the processing means calculate the environment model that incorporates the expected QoS score per grid cell.

Another example (e.g. example 29) relates to a previously-described example (e.g. one or more of the examples 23-28), in which the QoS metrics include at least one of: latency, receive signal strength indicator (RSSI) values, packet error rate (PER), jitter, bit error rate (BER), signal to noise ratio (SNR), signal to noise plus interference ratio (SINR), carrier to interference plus noise ratio (CINR), or modulation and coding schemes (MCS) histogram data.

An example (e.g. example 30) relates to an autonomous agent that includes a communication means for the autonomous agent to communicate with a computing device via a wireless network using one or more wireless links within an environment; and processing means for monitoring the one or more wireless links and to generate quality of service (QoS) metrics with respect to the one or more wireless links from the monitoring, the communication means transmitting the QoS metrics to the computing device for the generation of an environment model associated with the environment, and the processing means calculating a navigation path for the autonomous agent in accordance with the environment model for the autonomous agent to navigate to a destination within the environment.

Another example (e.g. example 31) relates to a previously-described example (e.g. example 30), in which the communication means communicates with an Edge network computing device that comprises the computing device.

Another example (e.g. example 32) relates to a previously-described example (e.g. one or more of the examples 30-31), in which the autonomous agent is from among a plurality of autonomous agents operating within the environment, the environment model comprises a set of grid cells, and the environment model incorporates an expected QoS score per grid cell from an aggregation of QoS metrics transmitted by each of the plurality of autonomous agents.

Another example (e.g. example 33) relates to a previously-described example (e.g. one or more of the examples 30-32), in which the expected QoS per grid cell score is based upon a weighted averaging function, with more recent values being assigned a higher weight.

Another example (e.g. example 34) relates to a previously-described example (e.g. one or more of the examples 30-33), in which the navigation path comprises a chain of connected grid cells from among the plurality of grid cells that indicate a path within the environment for the autonomous agent to traverse to reach a destination grid cell.

Another example (e.g. example 35) relates to a previously-described example (e.g. one or more of the examples 30-34), in which the processing means calculates the navigation path by iteratively executing a cost function that uses the expected QoS score per grid cell and an estimate of a possible QoS score from a grid cell in the navigation path to reach a destination grid cell.

Another example (e.g. example 36) relates to a previously-described example (e.g. one or more of the examples 30-35), in which the QoS metrics include at least one of: latency, receive signal strength indicator (RSSI) values, packet error rate (PER), jitter, bit error rate (BER), signal to noise ratio (SNR), signal to noise plus interference ratio (SINR), carrier to interference plus noise ratio (CINR), or modulation and coding schemes (MCS) histogram data.

An example (e.g. example 37) relates to a computing means that includes communication means for receiving, via a wireless network, sensor data from an autonomous agent operating within an environment after the sensor data is transmitted by the autonomous agent in accordance with a communication delay; processing means for calculating a navigation path for the autonomous agent to reach a destination within the environment using the sensor data, the navigation path comprising a plurality of waypoints, the calculation being associated with a computing delay; and a waypoint correction means for (i) receiving the plurality of waypoints, (ii) predicting a trajectory delay of the autonomous agent caused by the communication delay and the computing delay, and (iii) calculating a plurality of delay-corrected waypoints, the communication circuitry being further configured to transmit the plurality of delay-corrected waypoints to the autonomous agent for the autonomous agent to traverse the navigation path.

Another example (e.g. example 38) relates to a previously-described example (e.g. example 37), in which the computing means is an Edge network computing device.

Another example (e.g. example 39) relates to a previously-described example (e.g. one or more of the examples 37-38), in which the waypoint correction means comprises a deep neural network implementing a long short-term memory (LSTM) architecture.

Another example (e.g. example 40) relates to a previously-described example (e.g. one or more of the examples 37-39), in which the waypoint correction means calculates the plurality of delay-corrected waypoints further using a predicted delay associated with downlink communication latency with respect to a time required to transmit the plurality of delay-corrected waypoints to the autonomous agent.

Another example (e.g. example 41) relates to a previously-described example (e.g. one or more of the examples 37-40), in which the autonomous agent is from among a plurality of autonomous agents operating within the environment, and the processing means calculates the navigation path for the autonomous agent using an environment model comprising a set of grid cells having an expected QoS score per grid cell that is calculated using an aggregation of a respective set of QoS metrics received from each one of the plurality of autonomous agents, the QoS metrics corresponding to one or more wireless links used for communications between the computing device and the plurality of autonomous agents.

Another example (e.g. example 42) relates to a previously-described example (e.g. one or more of the examples 37-41), in which the QoS metrics include at least one of: latency, receive signal strength indicator (RSSI) values, packet error rate (PER), jitter, bit error rate (BER), signal to noise ratio (SNR), signal to noise plus interference ratio (SINR), carrier to interference plus noise ratio (CINR), or modulation and coding schemes (MCS) histogram data.

Another example (e.g. example 43) relates to a previously-described example (e.g. one or more of the examples 37-42), in which the plurality of waypoints form the navigation path between a starting location of the autonomous agent and the destination, each one of the plurality of waypoints represents a location within the environment that the autonomous agent is to traverse at a respective traversal time, and the time required to perform the calculation of the plurality of waypoints is associated with the computing delay.

Another example (e.g. example 44) relates to a previously-described example (e.g. one or more of the examples 37-43), in which the waypoint correction means calculates the plurality of delay-corrected waypoints to compensate for the trajectory delay such that the plurality of delay-corrected waypoints are synchronized with a trajectory of the autonomous agent within the environment when the autonomous agent executes the plurality of waypoints.

An apparatus as shown and described.

A method as shown and described.

CONCLUSION

The embodiments described herein are by way of example and not limitation, and other embodiments may be implemented. For example, the various apparatuses (e.g. the AMRs and/or central controller) may perform specific functions and/or execute specific algorithms and/or instructions. These executable instructions and/or the resulting tasks may comprise additional embodiments with respect to the manner or method in which they are executed, independently of the particular component that is executing these processes/tasks.

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A computing device, comprising:

a communication interface to receive quality of service (QoS) metrics from an autonomous agent operating within an environment of a wireless network in which the autonomous agent communicates with the computing device via one or more wireless links, wherein the QoS metrics correspond to the one or more wireless links and are generated by the autonomous agent via monitoring of the one or more wireless links; and one or more processors configured to:

generate an environment model comprising a plurality of grid cells of predetermined sizes, to which the QoS metrics are mapped, the environment model representing a model of the environment for navigation path planning of the autonomous agent within the environment;

calculate, using the environment model, a route within the environment comprising a plurality of waypoints, the route being based upon a predicted network performance along the route with respect to communications between the autonomous agent and the computing device via the one or more wireless links for the autonomous agent when traversing the route;

perform waypoint correction by (i) receiving a plurality of waypoints, (ii) predicting a trajectory delay of the autonomous agent caused by a communication delay and a computing delay, and (iii) calculating a plurality of delay-corrected waypoints, wherein the communication interface is configured to transmit, to the autonomous agent, a the plurality of delay-corrected waypoints as a command to cause the autonomous agent to traverse the calculated route by traversing the plurality of delay-corrected waypoints that comprise a subset of the plurality of grid cells of the environment model, wherein the plurality of delay-corrected waypoints that comprise the route within the environment that is based upon a predicted network performance with respect to communications between the autonomous agent and the computing device when the autonomous agent traverses the route, wherein the autonomous agent is from among a plurality of autonomous agents operating within the environment comprising autonomous mobile robots (AMRs), and wherein the environment model is shared among the plurality of autonomous agents for navigation path planning of each of the plurality of autonomous agents.

2. The computing device of claim 1, wherein the computing device is an Edge network computing device.

3. The computing device of claim 1, wherein the one or more processors are configured to aggregate the QoS metrics received from each of the plurality of autonomous agents to calculate an expected QoS score per grid cell that represents an expected QoS level in a respective grid cell.

4. The computing device of claim 3, wherein the one or more processors are configured to calculate the expected QoS score per grid cell using a weighted averaging function, with more recent values being assigned a higher weight.

5. The computing device of claim 1, wherein the calculated route comprises a chain of connected grid cells from among the plurality of grid cells that indicate a path within the environment for the autonomous agent to traverse to reach a destination grid cell.

6. The computing device of claim 3, wherein the one or more processors are configured to calculate the environment model that maps the expected QoS score per grid cell.

7. The computing device of claim 1, wherein the QoS metrics include: latency, receive signal strength indicator (RSSI) values, packet error rate (PER), jitter, bit error rate (BER), signal to noise ratio (SNR), signal to noise plus interference ratio (SINR), carrier to interference plus noise ratio (CINR), or modulation and coding schemes (MCS) histogram data.

8. An autonomous agent, comprising:

a communication interface to enable the autonomous agent to communicate with a computing device via a wireless network using one or more wireless links within an environment; and one or more processors configured to monitor the one or more wireless links and to generate quality of service (QoS) metrics with respect to the one or more wireless links from the monitoring, wherein the communication interface transmits the QoS metrics to the computing device for the generation of an environment model that is associated with the environment, wherein the environment model comprises a plurality of grid cells of predetermined sizes, to which the QoS metrics are mapped, wherein the one or more processors are configured to calculate, using the environment model, a route for the autonomous agent to use to navigate to a destination within the environment, wherein the communication interface is configured to receive, via the computing device, a plurality of delay-corrected waypoints as a command to cause the autonomous agent to traverse the calculated route by traversing the plurality of delay-corrected waypoints that comprise a subset of the plurality of grid cells of the environment model, wherein the plurality of delay-corrected waypoints are (i) computed based upon a predicted trajectory delay of the autonomous agent caused by a communication delay and a computing delay, and (ii) based upon a predicted network performance with respect to communications between the autonomous agent and the computing device when the autonomous agent traverses the route, wherein the calculated route is based upon a predicted network performance along the route with respect to communications between the autonomous agent and the computing device via the one or more wireless links for the autonomous agent when traversing the route, wherein the autonomous agent is from among a plurality of autonomous agents comprising autonomous mobile robots (AMRs) operating within the environment, and wherein the environment model is shared among the plurality of autonomous agents for navigation path planning of each of the plurality of autonomous agents.

9. The autonomous agent of claim 8, wherein the communication interface communicates with an Edge network computing device that comprises the computing device.

10. The autonomous agent of claim 8, wherein the environment model maps an expected QoS score per grid cell from an aggregation of QoS metrics transmitted by each of the plurality of autonomous agents.

11. The autonomous agent of claim 10, wherein the expected QoS score per grid cell is based upon a weighted averaging function, with more recent values being assigned a higher weight.

12. The autonomous agent of claim 8, wherein the calculated route comprises a chain of connected grid cells from among the plurality of grid cells that indicate a path within the environment for the autonomous agent to traverse to reach a destination grid cell corresponding to the destination within the environment.

13. The autonomous agent of claim 10, wherein the autonomous agent is configured to calculate the route by iteratively executing a cost function that uses the expected QoS score per grid cell and an estimate of a possible QoS score from a grid cell in the navigation route to reach a destination grid cell corresponding to the destination within the environment.

14. The autonomous agent of claim 8, wherein the QoS metrics include: latency, receive signal strength indicator (RSSI) values, packet error rate (PER), jitter, bit error rate (BER), signal to noise ratio (SNR), signal to noise plus interference ratio (SINR), carrier to interference plus noise ratio (CINR), or modulation and coding schemes (MCS) histogram data.

15. A computing device, comprising:

a communication interface to receive, via a wireless network, sensor data from an autonomous agent operating within an environment after the sensor data is transmitted by the autonomous agent in accordance with a communication delay;

one or more processors configured to calculate, using an environment model comprising a plurality of grid cells of predetermined sizes, to which Quality of Service (QoS) metrics of the wireless network are mapped, a route for the autonomous agent to reach a destination within the environment using the sensor data, the route comprising a plurality of waypoints, and the calculation being associated with a computing delay; and a neural network trained to perform waypoint correction by (i) receiving the plurality of waypoints, (ii) predicting a trajectory delay of the autonomous agent caused by the communication delay and the computing delay, and (iii) calculating a plurality of delay-corrected waypoints, wherein the communication interface transmits the plurality of delay-corrected waypoints as a command to cause the autonomous agent to traverse a navigation path by traversing the plurality of delay-corrected waypoints that comprise a subset of the plurality of grid cells of the environment model, wherein the plurality of delay-corrected waypoints that comprise the route within the environment that is based upon a predicted network performance with respect to communications between the autonomous agent and the computing device for the autonomous agent when traversing the route, wherein the autonomous agent is from among a plurality of autonomous agents comprising autonomous mobile robots (AMRs) operating within the environment, and wherein the environment model is shared among the plurality of autonomous agents for navigation path planning of each of the plurality of autonomous agents.

16. The computing device of claim 15, wherein the computing device is an Edge network computing device.

17. The computing device of claim 15, wherein the neural network comprises a deep neural network implementing a long short-term memory (LSTM) architecture.

18. The computing device of claim 15, wherein the neural network calculates the plurality of delay-corrected waypoints further using a predicted delay associated with downlink communication latency with respect to a time required to transmit the plurality of delay-corrected waypoints to the autonomous agent.

19. The computing device of claim 15, wherein:

the one or more processors are configured to calculate the route for the autonomous agent using the environment model having an expected QoS score per grid cell mapped to the plurality of grid cells, the expected QoS score being calculated using an aggregation of a respective set of QoS metrics received from each one of the plurality of autonomous agents, wherein the QoS metrics correspond to one or more wireless links used for communications between the computing device and the plurality of autonomous agents.

20. The computing device of claim 19, wherein the QoS metrics include: latency, receive signal strength indicator (RSSI) values, packet error rate (PER), jitter, bit error rate (BER), signal to noise ratio (SNR), signal to noise plus interference ratio (SINR), carrier to interference plus noise ratio (CINR), or modulation and coding schemes (MCS) histogram data.

21. The computing device of claim 15, wherein:

the plurality of waypoints form the route between a starting location of the autonomous agent and the destination, each one of the plurality of waypoints representing a location within the environment that the autonomous agent is to traverse at a respective traversal time, and the time required to perform the calculation of the plurality of waypoints is associated with the computing delay.

22. The computing device of claim 15, wherein the neural network calculates the plurality of delay-corrected waypoints to compensate for the trajectory delay such that the plurality of delay-corrected waypoints are synchronized with a trajectory of the autonomous agent within the environment when the autonomous agent executes the plurality of waypoints.

23. The computing device of claim 1, wherein the plurality of grid cells of the environment model indicate properties of respective objects that are contained within the respective grid cells that are present within the environment, and wherein the one or more processors are configured to update the environment model on a cell-by-cell basis with respect to the plurality of grid cells as sensor data is received from each of the plurality of autonomous agents with respect to the environment.

* * * * *